United States Patent
Yang et al.

(10) Patent No.: US 11,647,469 B2
(45) Date of Patent: May 9, 2023

(54) POWER HEADROOM REPORT ENHANCEMENT

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/987,047

(22) Filed: Aug. 6, 2020

(65) Prior Publication Data

US 2021/0051606 A1 Feb. 18, 2021

Related U.S. Application Data

(60) Provisional application No. 62/888,264, filed on Aug. 16, 2019.

(51) Int. Cl.
*H04W 52/36* (2009.01)
*H04W 52/10* (2009.01)
(Continued)

(52) U.S. Cl.
CPC ......... *H04W 52/365* (2013.01); *H04W 52/10* (2013.01); *H04W 52/241* (2013.01); *H04W 52/242* (2013.01); *H04W 80/02* (2013.01)

(58) Field of Classification Search
CPC ........... H04W 88/00–12; H04W 92/00; H04W 92/08; H04W 92/10; H04W 4/30–48; H04W 4/70; H04W 4/80
See application file for complete search history.

(56) References Cited

U.S. PATENT DOCUMENTS 9,706,502 B1 *  7/2017  Marupaduga ....... H04W 52/265
2011/0092217 A1 *  4/2011  Kim ..................... H04W 52/365
                                                         455/450
(Continued)

FOREIGN PATENT DOCUMENTS

WO   WO-2014162204 A1   10/2014
WO   WO-2018034541 A1   2/2018

OTHER PUBLICATIONS

International Search Report and Written Opinion—PCT/US2020/045407—ISA/EPO—dated Nov. 4, 2020 (194522WO).

*Primary Examiner* — San Htun
(74) *Attorney, Agent, or Firm* — Holland & Hart LLP

(57) ABSTRACT

Methods, systems, and devices for wireless communications are described. A user equipment (UE) may identify a trigger event configuration for power headroom reporting for a first service type that has a lower latency condition and a higher reliability condition than a second service type. For example, the first service type may be for low latency communications, and the second service type may be for mobile broadband (MBB) communications. The UE may detect a trigger event for power headroom reporting for the first service type based on the trigger event configuration. The UE may transmit a power headroom report for the first service type based on detecting the trigger event. By transmitting the power headroom report for the first service type, the UE may indicate whether power boosting for the first service type is available.

30 Claims, 18 Drawing Sheets

(51) Int. Cl.
  *H04W 52/24*    (2009.01)
  *H04W 80/02*    (2009.01)

(56) References Cited

U.S. PATENT DOCUMENTS

| | | | |
|---|---|---|---|
| 2013/0064131 A1* | 3/2013 | Kwon | H04W 52/365 370/252 |
| 2015/0264655 A1* | 9/2015 | Lee | H04W 52/365 370/329 |
| 2015/0271811 A1* | 9/2015 | Kim | H04W 52/365 370/329 |
| 2016/0323887 A1* | 11/2016 | Patel | H04W 52/365 |
| 2019/0082398 A1* | 3/2019 | Loehr | H04W 52/365 |
| 2019/0223116 A1* | 7/2019 | Chen | H04L 1/1614 |
| 2019/0313348 A1* | 10/2019 | MolavianJazi | H04W 52/365 |
| 2019/0349983 A1* | 11/2019 | Loehr | H04L 1/1819 |

* cited by examiner

POWER HEADROOM REPORT ENHANCEMENT

CROSS REFERENCE

The present Application for Patent claims the benefit of U.S. Provisional Patent Application No. 62/888,264 by YANG et al., entitled "POWER HEADROOM REPORT ENHANCEMENT," filed Aug. 16, 2019, assigned to the assignee hereof, and expressly incorporated by reference herein.

BACKGROUND

The following relates generally to wireless communications, and more specifically to power headroom report enhancement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may support wireless communications of different service types. Some of the different service types may have different reliability, latency, and power configurations. Some conventional techniques for configuring uplink transmissions of different service types can be improved.

SUMMARY

The described techniques relate to improved methods, systems, devices, and apparatuses that support power headroom report enhancement. Generally, the described techniques provide for generating a power headroom report for a cell based on a service type of communications supported by the cell. A wireless communications system may support multiple different service types. For example, the wireless communications system may support mobile broadband (MBB) communications and low latency communications, which may have more stringent latency and reliability conditions. In some cases, a base station of the wireless communications system may schedule a user equipment (UE) for an uplink low latency transmission on resources which overlap with other uplink MBB transmissions, for example from other UEs. The uplink MBB transmissions may generally have a higher transmit power, which may affect (e.g., interfere with) reception of the uplink low latency transmission at the base station. To enhance detection of the uplink low latency transmission, the wireless communications system may support for the UE to perform a power boosting for the uplink low latency transmission. For example, the UE may increase the transmit power for uplink low latency transmissions when low latency resources overlap with MBB resources.

Techniques described herein support enhanced power headroom reporting to support power boosting for low latency communications. For example, a power headroom report for an uplink carrier may indicate whether the UE can perform power boosting for low latency communications or not based on the maximum transmit power, the actual transmit power (e.g., without boosting), and a maximum power boosting value for the uplink carrier. In some cases, the UE may be configured with parameters and triggers to generate a power headroom report which are based on low latency communications. For example, the UE may be triggered to generate a power headroom report whenever power boosting functionality is configured or reconfigured. In some examples, the UE may have additional thresholds for generating a power headroom report for low latency communications, which may be different than thresholds for generating a conventional power headroom report or a power headroom report for MBB communications. Additional techniques for utilizing power loops for specific service types, for example by using a first power control loop for low latency communications and using a second power control loop for MBB communications. For example, the UE may include respective fields for the first power control loop and the second power control loop in the power headroom report.

A method of wireless communication by a UE is described. The method may include detecting a trigger event for power headroom reporting for a first service type that has a lower latency condition and a higher reliability condition than a second service type and transmitting a power headroom report for the first service type based on detecting the trigger event. In some examples, the method may include identifying a trigger event configuration for power headroom reporting for the first service type.

An apparatus for wireless communication by a UE is described. The apparatus may include a processor, memory coupled with the processor, and instructions stored in the memory. The instructions may be executable by the processor to cause the apparatus to detect a trigger event for power headroom reporting for a first service type that has a lower latency condition and a higher reliability condition than a second service type and transmit a power headroom report for the first service type based on detecting the trigger event. In some examples, the instruction may be executable by the processor to cause the apparatus to identify a trigger event configuration for power headroom reporting for the first service type.

Another apparatus for wireless communication by a UE is described. The apparatus may include means for detecting a trigger event for power headroom reporting for a first service type that has a lower latency condition and a higher reliability condition than a second service type and transmitting a power headroom report for the first service type based on detecting the trigger event. In some examples, the apparatus may include means for identifying a trigger event configuration for power headroom reporting for the first service type.

A non-transitory computer-readable medium storing code for wireless communication by a UE is described. The code may include instructions executable by a processor to detect a trigger event for power headroom reporting for a first service type that has a lower latency condition and a higher reliability condition than a second service type and transmit a power headroom report for the first service type based on detecting the trigger event. In some examples, the code may include instructions executable by the processor to identify a trigger event configuration for power headroom reporting for the first service type.

In some examples of the method, apparatuses, and non-transitory computer-readable medium described herein, identifying the trigger event configuration may include operations, features, means, or instructions for receiving, from a base station, the trigger event configuration.

In some examples of the method, apparatuses, and non-transitory computer-readable medium described herein, identifying the trigger event configuration may include operations, features, means, or instructions for retrieving the trigger event configuration from a storage device of the UE.

In some examples of the method, apparatuses, and non-transitory computer-readable medium described herein, identifying the trigger event configuration may include operations, features, means, or instructions for identifying the trigger event configuration for the first service type that indicates to detect the trigger event based on receiving a power boosting functionality configuration or a power boosting functionality reconfiguration for the first service type.

In some examples of the method, apparatuses, and non-transitory computer-readable medium described herein, identifying the trigger event configuration may include operations, features, means, or instructions for identifying the trigger event configuration for the first service type that indicates to detect the trigger event based on detecting that the UE lacks sufficient headroom for power boosting for the first service type and based on detecting that a prohibit timer at the UE may have expired.

In some examples of the method, apparatuses, and non-transitory computer-readable medium described herein, identifying the trigger event configuration may include operations, features, means, or instructions for identifying the trigger event configuration for the first service type that indicates to detect the trigger event based on detecting that the UE may have transitioned from lacking sufficient headroom for power boosting for the first service type to having sufficient headroom for power boosting for the first service type and based on detecting that a prohibit timer at the UE may have expired.

In some examples of the method, apparatuses, and non-transitory computer-readable medium described herein, transmitting the power headroom report may include operations, features, means, or instructions for transmitting the power headroom report that may be associated with power boosting functionality for the first service type.

In some examples of the method, apparatuses, and non-transitory computer-readable medium described herein, transmitting the power headroom report may include operations, features, means, or instructions for transmitting the power headroom report including a power headroom value that may be calculated based on a configured power boosting value.

In some examples of the method, apparatuses, and non-transitory computer-readable medium described herein, the configured power boosting value may be a largest configured power boosting value in a set of configured power boosting values.

In some examples of the method, apparatuses, and non-transitory computer-readable medium described herein, transmitting the power headroom report may include operations, features, means, or instructions for transmitting a medium access control (MAC) control element (CE) including the power headroom report on a first uplink shared channel for the first service type, a second uplink shared channel for the second service type, or both.

In some examples of the method, apparatuses, and non-transitory computer-readable medium described herein, transmitting the power headroom report may include operations, features, means, or instructions for transmitting the power headroom report that indicates a power headroom value corresponding to a single carrier.

In some examples of the method, apparatuses, and non-transitory computer-readable medium described herein, transmitting the power headroom report may include operations, features, means, or instructions for transmitting the power headroom report that indicates a set of power headroom values that respectively correspond to a set of carriers.

In some examples of the method, apparatuses, and non-transitory computer-readable medium described herein, transmitting the power headroom report may include operations, features, means, or instructions for transmitting the power headroom report on a first uplink shared channel for the first service type.

Some examples of the method, apparatuses, and non-transitory computer-readable medium described herein may further include operations, features, means, or instructions for detecting a second trigger event for power headroom reporting for the second service type, and refraining from transmitting a second power headroom report for the second service type on an uplink shared channel for the first service type.

In some examples of the method, apparatuses, and non-transitory computer-readable medium described herein, transmitting the power headroom report may include operations, features, means, or instructions for transmitting the power headroom report that indicates a power headroom value calculated for at least one carrier configured for the first service type.

In some examples of the method, apparatuses, and non-transitory computer-readable medium described herein, the power headroom report does not include a power headroom value calculated for any carrier configured for the second service type and not the first service type.

In some examples of the method, apparatuses, and non-transitory computer-readable medium described herein, identifying the trigger event configuration may include operations, features, means, or instructions for identifying the trigger event configuration for the first service type that indicates to detect the trigger event based on detecting a path loss change that satisfies a path loss threshold for the first service type.

In some examples of the method, apparatuses, and non-transitory computer-readable medium described herein, the path loss threshold for the first service type may be smaller than a path loss threshold for the second service type.

In some examples of the method, apparatuses, and non-transitory computer-readable medium described herein, a duration of the timer associated with the first service type may be shorter than a duration of a timer associated with the second service type.

In some examples of the method, apparatuses, and non-transitory computer-readable medium described herein, the timer associated with the first service type may be a periodic timer or a prohibition timer.

In some examples of the method, apparatuses, and non-transitory computer-readable medium described herein, identifying the trigger event configuration may include operations, features, means, or instructions for identifying the trigger event configuration for the first service type that indicates to detect the trigger event based on detecting that a timer associated with the first service type may have expired.

In some examples of the method, apparatuses, and non-transitory computer-readable medium described herein, transmitting the power headroom report may include operations, features, means, or instructions for transmitting the power headroom report that indicates a first power headroom for a first power control loop associated with the first service type and a second power headroom for a second power control loop associated with the second service type.

In some examples of the method, apparatuses, and non-transitory computer-readable medium described herein, the power headroom report includes a first power headroom field for the first power control loop and a second power headroom field for the second power control loop.

In some examples of the method, apparatuses, and non-transitory computer-readable medium described herein, the first power control loop and the second power control loop may be configured for a same uplink carrier.

In some examples of the method, apparatuses, and non-transitory computer-readable medium described herein, identifying the trigger event configuration may include operations, features, means, or instructions for identifying the trigger event configuration for the first service type that indicates to detect the trigger event based on detecting a second trigger event for power headroom reporting for the second service type.

In some examples of the method, apparatuses, and non-transitory computer-readable medium described herein, transmitting the power headroom report may include operations, features, means, or instructions for transmitting the power headroom report on a second uplink shared channel configured for the second service type.

In some examples of the method, apparatuses, and non-transitory computer-readable medium described herein, transmitting the power headroom report may include operations, features, means, or instructions for transmitting the power headroom report on an earlier of a first uplink shared channel configured for the first service type or a second uplink shared channel configured for the second service type.

In some examples of the method, apparatuses, and non-transitory computer-readable medium described herein, the power headroom report may be an actual power headroom report, a virtual power headroom report, or both.

A method of wireless communication by a base station is described. The method may include transmitting, to a UE, a trigger event configuration for power headroom reporting for a first service type that has a lower latency condition and a higher reliability condition than a second service type and receiving, from the UE, a power headroom report for the first service type based on the trigger event configuration.

An apparatus for wireless communication by a base station is described. The apparatus may include a processor, memory coupled with the processor, and instructions stored in the memory. The instructions may be executable by the processor to cause the apparatus to transmit, to a UE, a trigger event configuration for power headroom reporting for a first service type that has a lower latency condition and a higher reliability condition than a second service type and receive, from the UE, a power headroom report for the first service type based on the trigger event configuration.

Another apparatus for wireless communication by a base station is described. The apparatus may include means for transmitting, to a UE, a trigger event configuration for power headroom reporting for a first service type that has a lower latency condition and a higher reliability condition than a second service type and receiving, from the UE, a power headroom report for the first service type based on the trigger event configuration.

A non-transitory computer-readable medium storing code for wireless communication by a base station is described. The code may include instructions executable by a processor to transmit, to a UE, a trigger event configuration for power headroom reporting for a first service type that has a lower latency condition and a higher reliability condition than a second service type and receive, from the UE, a power headroom report for the first service type based on the trigger event configuration.

In some examples of the method, apparatuses, and non-transitory computer-readable medium described herein, transmitting the trigger event configuration may include operations, features, means, or instructions for transmitting the trigger event configuration that indicates to detect a trigger event for power headroom reporting for the first service type based on receiving a power boosting functionality configuration or a power boosting functionality reconfiguration for the first service type.

In some examples of the method, apparatuses, and non-transitory computer-readable medium described herein, receiving a power boosting functionality configuration or a power boosting functionality reconfiguration may include operations, features, means, or instructions for receiving a configuration or a reconfiguration of a Radio Resource Control power control parameter or receiving a configuration of an open-loop power control parameter set indication in downlink control information.

In some examples of the method, apparatuses, and non-transitory computer-readable medium described herein, transmitting the trigger event configuration may include operations, features, means, or instructions for transmitting the trigger event configuration that indicates to detect a trigger event for power headroom reporting for the first service type based on lacking sufficient headroom for power boosting for the first service type and based on a prohibit timer at the UE being expired.

In some examples of the method, apparatuses, and non-transitory computer-readable medium described herein, transmitting the trigger event configuration may include operations, features, means, or instructions for transmitting the trigger event configuration that indicates to detect a trigger event for power headroom reporting for the first service type based on detecting a transition from lacking sufficient headroom for power boosting for the first service type to having sufficient headroom for power boosting for the first service type and based on a prohibit timer at the UE being expired.

In some examples of the method, apparatuses, and non-transitory computer-readable medium described herein, receiving the power headroom report may include operations, features, means, or instructions for receiving the power headroom report that may be associated with power boosting functionality for the first service type.

In some examples of the method, apparatuses, and non-transitory computer-readable medium described herein, receiving the power headroom report may include operations, features, means, or instructions for receiving the power headroom report including a power headroom value that may be calculated based on a configured power boosting value.

In some examples of the method, apparatuses, and non-transitory computer-readable medium described herein, the configured power boosting value may be a largest configured power boosting value in a set of configured power boosting values.

In some examples of the method, apparatuses, and non-transitory computer-readable medium described herein, receiving the power headroom report may include operations, features, means, or instructions for receiving a medium access control (MAC) control element (CE) including the power headroom report on a first uplink shared channel for the first service type, a second uplink shared channel for the second service type, or both.

In some examples of the method, apparatuses, and non-transitory computer-readable medium described herein, receiving the power headroom report may include operations, features, means, or instructions for receiving the power headroom report that indicates a power headroom value corresponding to a single carrier.

In some examples of the method, apparatuses, and non-transitory computer-readable medium described herein, receiving the power headroom report may include operations, features, means, or instructions for receiving the power headroom report that indicates a set of power headroom values that respectively correspond to a set of carriers.

In some examples of the method, apparatuses, and non-transitory computer-readable medium described herein, receiving the power headroom report may include operations, features, means, or instructions for receiving the power headroom report on an uplink shared channel for the first service type.

In some examples of the method, apparatuses, and non-transitory computer-readable medium described herein, the trigger event configuration indicates that the UE may be prohibited from transmitting a second power headroom report for the second service type on an uplink shared channel for the first service type.

In some examples of the method, apparatuses, and non-transitory computer-readable medium described herein, receiving the power headroom report may include operations, features, means, or instructions for receiving the power headroom report that indicates a power headroom value calculated for at least one carrier configured for the first service type.

In some examples of the method, apparatuses, and non-transitory computer-readable medium described herein, the power headroom report does not include a power headroom value calculated for any carrier configured for the second service type and not the first service type.

In some examples of the method, apparatuses, and non-transitory computer-readable medium described herein, transmitting the trigger event configuration may include operations, features, means, or instructions for transmitting the trigger event configuration that indicates to detect a trigger event for power headroom reporting for the first service type based on detecting a path loss change that satisfies a path loss threshold for the first service type.

In some examples of the method, apparatuses, and non-transitory computer-readable medium described herein, the path loss threshold for the first service type may be smaller than a path loss threshold for the second service type.

In some examples of the method, apparatuses, and non-transitory computer-readable medium described herein, transmitting the trigger event configuration may include operations, features, means, or instructions for transmitting the trigger event configuration that indicates to detect a trigger event for power headroom reporting for the first service type based on detecting that a timer associated with the first service type may have expired.

In some examples of the method, apparatuses, and non-transitory computer-readable medium described herein, a duration of the timer associated with the first service type may be shorter than a duration of a timer associated with the second service type.

In some examples of the method, apparatuses, and non-transitory computer-readable medium described herein, the timer associated with the first service type may be a periodic timer or a prohibition timer.

In some examples of the method, apparatuses, and non-transitory computer-readable medium described herein, receiving the power headroom report may include operations, features, means, or instructions for receiving the power headroom report that indicates a first power headroom for a first power control loop associated with the first service type and a second power headroom for a second power control loop associated with the second service type.

In some examples of the method, apparatuses, and non-transitory computer-readable medium described herein, the power headroom report includes a first power headroom field for the first power control loop and a second power headroom field for the second power control loop.

In some examples of the method, apparatuses, and non-transitory computer-readable medium described herein, the first power control loop and the second power control loop may be configured for a same uplink carrier.

In some examples of the method, apparatuses, and non-transitory computer-readable medium described herein, transmitting the trigger event configuration may include operations, features, means, or instructions for transmitting the trigger event configuration that indicates to detect a trigger event for power headroom reporting for the first service type based on detecting a second trigger event for power headroom reporting for the second service type.

In some examples of the method, apparatuses, and non-transitory computer-readable medium described herein, receiving the power headroom report may include operations, features, means, or instructions for receiving the power headroom report on a second uplink shared channel configured for the second service type.

In some examples of the method, apparatuses, and non-transitory computer-readable medium described herein, receiving the power headroom report may include operations, features, means, or instructions for receiving the power headroom report on an earlier of a first uplink shared channel configured for the first service type or a second uplink shared channel configured for the second service type.

In some examples of the method, apparatuses, and non-transitory computer-readable medium described herein, the power headroom report may be an actual power headroom report, a virtual power headroom report, or both.

DETAILED DESCRIPTION

Figure 1:
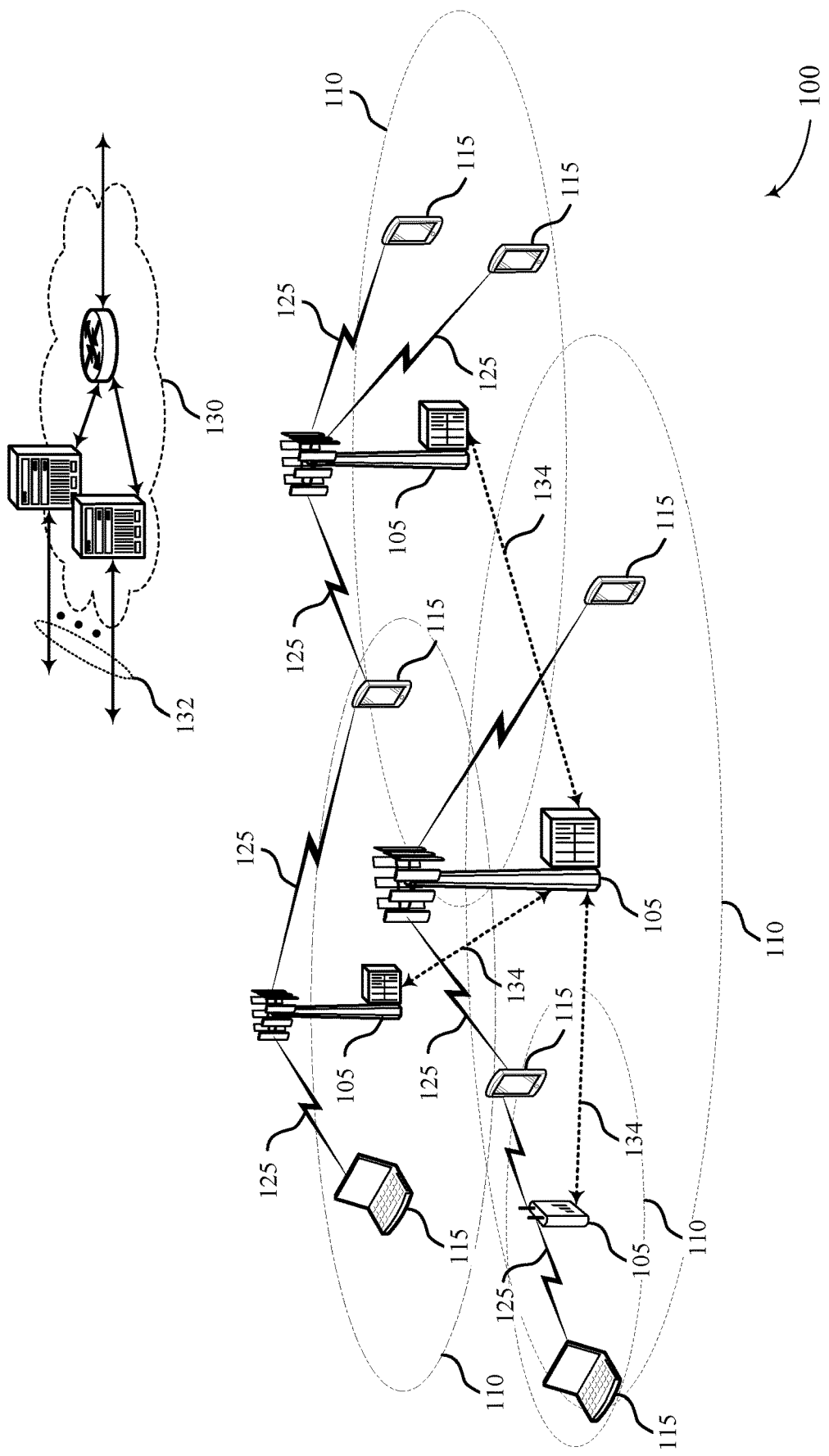
FIG. 1 illustrates an example of a system for wireless communications that supports power headroom report enhancement in accordance with aspects of the present disclosure.

A wireless communications system may support multiple different service types. For example, the wireless communications system may support mobile broadband (MBB) communications and low latency communications, which may have more stringent latency and reliability conditions. In some cases, a base station of the wireless communications system may schedule a user equipment (UE) for an uplink low latency transmission on resources which overlap with other uplink MBB transmissions, for example from other UEs. The uplink MBB transmissions may generally have a higher transmit power, which may affect (e.g., interfere with) reception of the uplink low latency transmission at the base station. To enhance detection of the uplink low latency transmission, the wireless communications system may support for the UE to perform a power boosting for the uplink low latency transmission. For example, the UE may increase the transmit power for uplink low latency transmissions when low latency resources overlap with MBB resources. However, the UE may have a maximum transmit power which the UE can use for uplink transmissions to the base station. In some conventional systems, a UE may transmit a power headroom report to a base station which indicates the difference between the maximum transmit power and the currently used transmit power. However, conventional power headroom reporting techniques do not consider transmit power boosting or a service type of the cell associated with the power headroom report.

Techniques described herein support enhanced power headroom reporting. For example, the power headroom reporting techniques described herein may be based on service type used by a UE generating the power headroom report. Some information included in the power headroom report may be based on power boosting low latency transmissions. For example, a power headroom report for an uplink carrier may indicate whether the UE can perform power boosting for low latency communications or not based on the maximum transmit power, the actual transmit power (e.g., without boosting), and a maximum power boosting value for the uplink carrier. In some cases, the UE may be configured with parameters and triggers to generate a power headroom report which are based on low latency communications. For example, the UE may be triggered to generate a power headroom report whenever power boosting functionality is configured or reconfigured. In some examples, the UE may have additional thresholds for generating a power headroom report for low latency communications, which may be different than thresholds for generating a conventional power headroom report or a power headroom report for MBB communications. Additional techniques for utilizing power loops for specific service types, for example by using a first power control loop for low latency communications and using a second power control loop for MBB communications. The UE may include respective fields for the first power control loop and the second power control loop in the power headroom report.

Aspects of the disclosure are initially described in the context of a wireless communications system. Aspects of the disclosure are further illustrated by and described with reference to apparatus diagrams, system diagrams, and flowcharts that relate to power headroom report enhancement.

FIG. 1 illustrates an example of a wireless communications system 100 that supports power headroom report enhancement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may support multiple different service types. For example, the wireless communications system 100 may support MBB communications and low latency communications, which may have more stringent latency and reliability conditions. In some cases, a base station 105 may schedule a UE 115 for an uplink low latency transmission on resources which overlap with other uplink MBB transmissions, for example from other UEs 115. The uplink MBB transmissions may generally have a higher transmit power, which may affect (e.g., interfere with) reception of the uplink low latency transmission at the base station 105.

To enhance detection of the uplink low latency transmission, the wireless communications system 100 may support for the UE 115 to perform a power boosting for the uplink low latency transmission. For example, the UE 115 may increase the transmit power for uplink low latency transmissions when low latency resources overlap with MBB resources. However, the UE 115 may have a maximum transmit power which the UE 115 can use for uplink transmissions to the base station 105. The maximum transmit power may, in some cases, be configured per-cell or per-base station 105.

In some cases, the UE 115 may transmit a power headroom report to a base station which indicates the difference between the maximum transmit power and the currently used transmit power. Techniques described herein support enhanced power headroom reporting to support power boosting for low latency communications. In some cases, the UE 115 may generate a power headroom report based on service. Some information included in the power headroom report may be used by the base station 105 to determine whether power boosting for low latency transmissions is available. For example, a power headroom report for an uplink carrier may indicate whether the UE 115 can perform power boosting for low latency communications or not based on the maximum transmit power, the actual transmit power (e.g., without boosting), and a maximum power boosting value for the uplink carrier. In some cases, the UE 115 may be configured with parameters and triggers to generate a power headroom report which are based on low latency communications.

Figure 2:
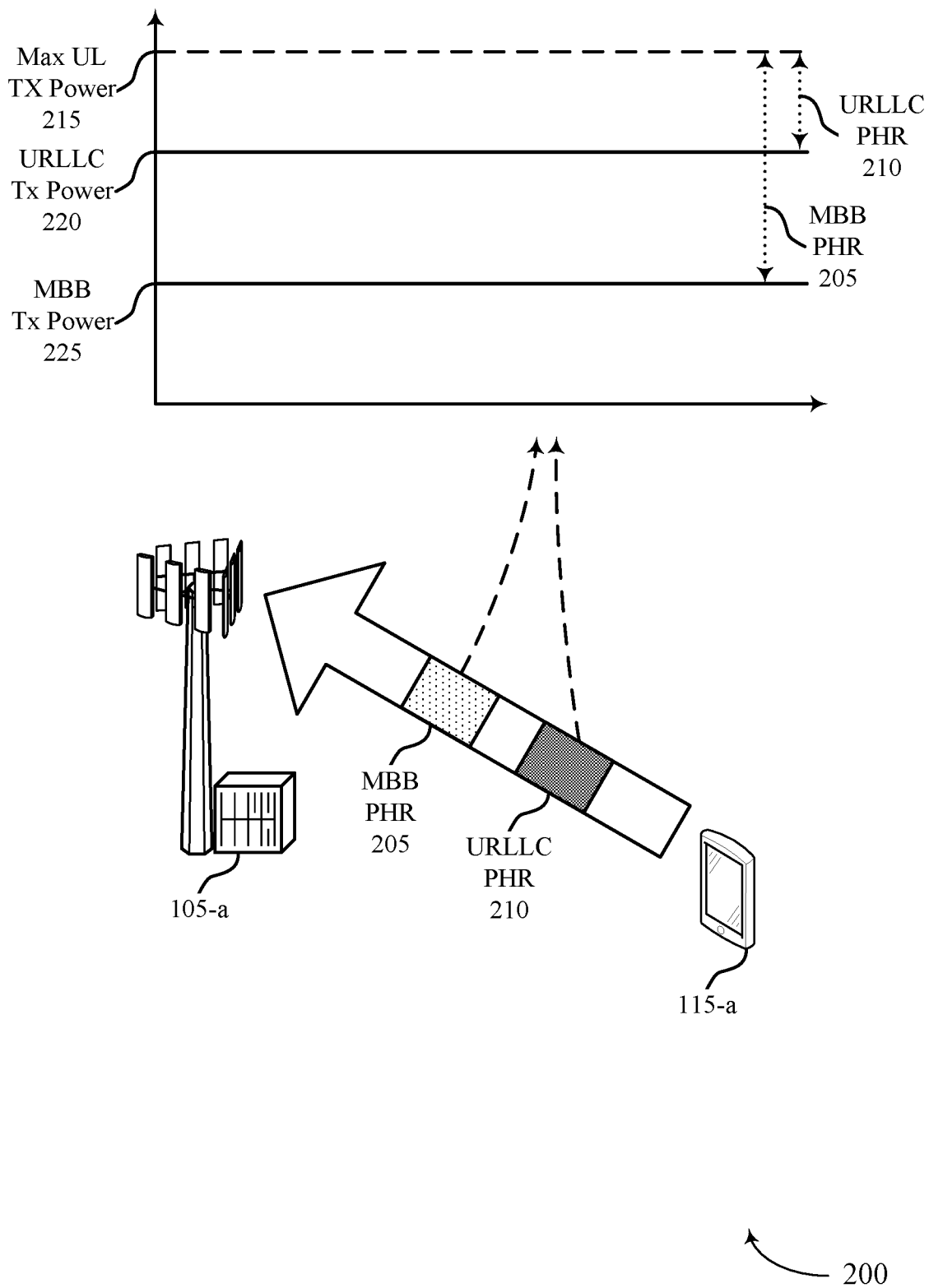
FIG. 2 illustrates an example of a wireless communications system that supports power headroom report enhancement in accordance with aspects of the present disclosure.

FIG. 2 illustrates an example of a wireless communications system 200 that supports power headroom report enhancement in accordance with aspects of the present disclosure. In some examples, the wireless communications system 200 may implement aspects of wireless communication system 100. The wireless communications system 200 may include UE 115-a and base station 105-a, which may be examples of a UE 115 and a base station 105 as described with reference to FIG. 1.

The wireless communications system may support wireless communications with different services types. For example, UE 115-a and base station 105-a may support MBB communications, low latency communications, or both. In some cases, ultra-reliable low latency communications (URLLC) may be an example of the low latency communications. Enhanced MBB (eMBB) may be an example of the MBB communications. In some cases, base station 105-a may serve multiple UEs 115, each of which may support eMBB communications or low latency communications, or both eMBB communications and low latency communications.

UE 115-a may have an uplink transmit power budget. For example, UE 115-a may be configured with a maximum uplink transmit power 215. The maximum uplink transmit power 215 may be based on per-cell maximum transmit powers, a total uplink transmit budget for all uplink communications, or a combination thereof. In an example, UE 115-a may transmit an uplink URLLC message with a URLLC transmit power 220, and UE 115-a may transmit an uplink eMBB message with an MBB transmit power 225.

In some example, UE 115-a may report an uplink transmit power headroom to base station 105-a. Power headroom may generally refer to how much remaining power is available for UE 115-a to use for uplink transmissions. For example, the power headroom may be the difference between a current transmit power value and the maximum uplink transmit power 215, indicating how much the current transmit power value can be increased by before reaching the transmit power limit. For example, a power headroom report may indicate the power difference between a shared channel transmission, or a sounding reference signal (SRS) transmission, and the maximum transmit power supported for the cell. Therefore, the power headroom may be the difference between the maximum transmit power and the power of the transmission, or Power Headroom= $P_{max} - transmission$.

UE 115-a may report different types of power headroom to base station 105-a during the power headroom reporting procedure. In some cases, the power headroom report may include one or more types of power headroom information. For a first type of power headroom, UE 115-a may report the difference between a nominal UE maximum transmit power (e.g., the maximum uplink transmit power 215) and the estimated power used for an uplink shared channel transmission per activated serving cell. For a second type of power headroom, UE 115-a may report the difference between the nominal UE maximum transmit power and the estimated power for uplink shared channel and uplink control channel transmission on a secondary primary cell of another MAC entity in a dual connectivity configuration. For a third type of power headroom, UE 115-a may report the difference between the nominal UE maximum transmit power and the estimated power for SRS transmission per activated serving cell.

In some cases, UE 115-a may report the power headroom for secondary cells (e.g., in a carrier aggregation configuration) which are not actually transmitting. Therefore, UE 115-a may not have an exact measurement of an uplink transmit power for the secondary cells. Instead, UE 115-a may estimate the uplink transmit power that would be used for an uplink transmission on the active, but not currently used, secondary cells. In some cases, this may be referred to as virtual power headroom reporting, where UE 115-a indicates the power difference between a virtual physical uplink shared channel (PUSCH) or SRS with a configured format and the maximum transmit power for the corresponding cell. For example, UE 115-a may transmit the report on a primary cell, reporting the power headroom based on the actual transmission power of the primary cell and based on estimations for secondary cells.

An example format of a power headroom report for some systems may be shown by Table 1 below. In some cases, a power headroom report for a cell may be based on eight bits of information, or one octet. The value for P may indicate whether power backoff is applied, V may indicate whether the power headroom is for a virtual transmission or an actual transmission, and R may be a reserved bit (e.g., which may be used for other signaling). Table 1 may be an example of a power headroom report indicating power headroom for multiple configured cells. As shown, a power headroom value for a cell may be based on the type of power headroom (e.g., type one, two, or three described above). In Table 1, Type X may be at least any of type 1, type 2, or type 3. In Table 1, a UE 115 may report power headroom for a primary cell, an SPCell, and n serving cells, resulting in m different power headroom measurements.

TABLE 1

| $C_7$ | $C_6$ | $C_5$ | $C_4$ | $C_3$ | $C_2$ | $C_1$ | R |
|---|---|---|---|---|---|---|---|
| P | V | PH (Type 2, SPCell of the other MAC entity) | | | | | |
| R | R | $P_{CMAX,f,c}1$ | | | | | |
| P | V | PH (Type 1, PCell) | | | | | |
| R | R | $P_{CMAX,f,c}2$ | | | | | |
| P | V | PH (Type X, Serving Cell 1) | | | | | |
| R | R | $P_{CMAX,f,c}3$ | | | | | |
| | | ... | | | | | |
| P | V | PH (Type X, Serving Cell n) | | | | | |
| R | R | $P_{CMAX,f,c}m$ | | | | | |

UE 115-a may be triggered to transmit a power headroom report. For example, UE 115-a may be triggered to transmit the power headroom report if a periodic timer expires. In some cases, UE 115-a may aperiodically report the power headroom, for example by detecting a change in path loss or a change in a configuration. In some cases, UE 115-a may have a timer running (e.g., a prohibit timer) which prevents UE 115-a from transmitting excessive power headroom reports. Once UE 115-a transmits a power headroom report, UE 115-a may start the prohibit timer, and UE 115-a may not transmit another power headroom report until the prohibit timer finishes.

There may be multiple different examples of aperiodic power headroom reporting. For example, UE 115-a may be triggered to report the power headroom if UE 115-a detects a change in path loss which exceeds a threshold. For example, if the path loss has changed greater than a threshold amount for at least one activated serving cell of any MAC entity, UE 115-a may be triggered to report the power headroom. In some cases, UE 115-a may only transmit the power headroom report if the prohibit timer expires, or has expired, and the pathloss has changed more than the threshold. A parameter such as "phr-Tx-PowerFactorChange" may be an example of a parameter for the path loss threshold, which may be measured in decibels.

If UE 115-a detects an activation of a secondary cell of any MAC entity with configured uplink, UE 115-a may be triggered to report a power headroom report. If a power headroom reporting functionality is configured or reconfigured by upper layers (e.g., without disabling the functionality), UE 115-a may be triggered to report the power headroom. If a PSCell (e.g., of a dual connectivity configuration) is activated, or a new PSCell is added or changed, UE 115-a may be triggered to report power headroom.

In some cases, if the prohibit timer expires, or has expired, and a MAC entity has uplink resources for a new transmission, UE 115-a may report the power headroom based on meeting one or more conditions. One condition may be if there are uplink resource allocated for transmission. Another condition may be if there is a physical uplink control channel (PUCCH) transmission on the cell, and the required power backoff based on power management for the cell has changed more than a power factor change threshold since the last transmission of a power headroom report when the MAC entity had uplink resources allocated for transmission or PUCCH transmission on the cell.

UE 115-a may be configured to report power headroom for just one cell or for multiple cells. When UE 115-a is configured in a multiple-PHR mode, UE 115-a may report the power headroom of all configured uplink cells of a MAC entity even if UE 115-a is triggered to report the power headroom for one cell. If UE 115-a is configured for a single entry power headroom format, UE 115-a may report just the power headroom of the primary cell. In some cases, UE 115-a may be triggered to report power headroom for just a secondary cell while configured for the single entry power headroom format. In some cases, UE 115-a may report virtual power headroom measurements for uplink cells that do not have scheduled uplink transmissions when configured in the multiple-power headroom report mode.

In some cases, the wireless communications system 200 may support multiplexing for UEs 115 which support different service types. For example, the wireless communications system 200 may support inter-UE eMBB/URLLC multiplexing. In some cases, base station 105-a may schedule a low latency uplink transmission on a resource that was previously allocated to MBB uplink transmissions. To support the multiplexing, power boosting for URLLC devices may be implemented. For example, a URLLC UE 115, which is scheduled for resources which overlap with an eMBB UE 115, may boost a transmit power on the overlapping resources. This may improve detection of the URLLC transmission at the receiving base station 105. Some conventional techniques for power headroom reporting may be insufficient for providing power headroom information when power boosting for low latency devices is supported. For example, base station 105-a may not have up-to-date information when scheduling UE 115-a to determine whether URLLC power boosting can be applied.

Therefore, the wireless communications system 200 may support techniques for power headroom reporting while considering power boosting techniques. In some cases, UE 115-a may be triggered to transmit power headroom reports for cells configured for low latency communications, such as a low latency power headroom report 210. In some cases, the power headroom reports for low latency communications may include different information than conventional power headroom reports, power headroom reports which are configured for eMBB communications (e.g., an MBB power headroom report 205), or power headroom reports which are not configured for low latency communications.

For example, UE 115-a may have additional triggering events for reporting power headroom based on low latency communications. The triggering events for transmitting the low latency power headroom may be based on indicating whether UE 115-a is able to apply power boosting for uplink low latency transmissions. In some cases, these additional triggering events may provide base station 105-a with power headroom information such that base station 105-a can determine whether or not power boosting can be applied at UE 115-a.

In some cases, UE 115-a may be triggered to transmit a power headroom report upon configuration or reconfiguration of the power boosting functionality at a higher layer. In some cases, power boosting may be referred to as enhanced open-loop power control or dynamic open-loop power control. In some examples, the power headroom report may be triggered if the UE is configured or reconfigured with enhanced open-loop power control functionality on an uplink carrier. For example, the UE may determine that a URLLC power headroom report is triggered if the UE receives a configuration or reconfiguration of a higher layer parameter (e.g., pusch-PowerControl-v16xy) or the UE may determine that a URLLC power headroom report is triggered if the UE is configured with an open-loop power control parameter set indication (e.g., olpc-ParameterSetForDCI-Format0-1-r16 or olpc-ParameterSetForDCI-Format0-2-r16) in DCI (e.g., either DCI format 0_1 or DCI format 0_2) through a higher layer parameter (e.g., RRC parameter). In some cases, the low latency power headroom report 210 may be reported in the first low latency shared channel transmission (e.g., the first URLLC PUSCH transmission) scheduled after the power headroom reporting functionality is configured or reconfigured in the upper layer. Additionally, or alternatively, power headroom may be reported in the first low latency shared channel transmission scheduled with power boosting after the power headroom reporting functionality is configured or reconfigured in the upper layer.

In some examples, UE 115-a may be triggered to send a power headroom report upon detecting that UE 115-a does not have enough headroom for power boosting. In this example, UE 115-a may transmit a power headroom report indicating negative values, which may show the difference in power headroom for UE 115-a to perform power boosting. In some cases, UE 115-a may be triggered to transmit a power headroom report if UE 115-a changes from not having sufficient headroom for power boosting to having sufficient headroom for power boosting. Then, UE 115-a may transmit a power headroom report with positive values, which may show how much additional headroom UE 115-a has in addition to the headroom used for power boosting.

In some examples of the above triggers, UE 115-a may also check to see if a prohibit timer has expired. In some cases, to trigger a power headroom report, the prohibit timer (e.g., "phr-ProhibitTimer") may first expire or be expired. For example, UE 115-a may detect that it does not have enough headroom for power boost and may check that the prohibit timer has expired. If UE 115-a does not have enough headroom and the prohibit timer has expired, UE 115-a may transmit a power headroom report for low latency communications to base station 105-a. In another example, UE 115-a may detect that the amount of headroom switches from being unable to perform power boosting to being able to perform power boosting, then UE 115-a may check the prohibit and transmit a power headroom report if the prohibit timer has expired.

The low latency power headroom report 210 may, in some cases, have a power headroom report format or type based on power boosting for low latency communications. For example, the power headroom calculation may be based on accounting for the largest configured power boosting value. The power headroom report value may be, for example, $PHR=P_{c,max}-P_{tx}-\Delta P_{max}$, where $P_{c,max}$ denotes the maximum transmit power limit for a cell c, $\Delta P_{max}$ denotes the maximum power boosting value configured for the uplink carrier, and $P_{tx}$ denotes the actual transmission power without power boosting. Therefore, the power headroom value (PHR) may indicate whether power boosting can be applied (e.g., by indicating a positive value) or whether power boosting cannot be applied (e.g., by indicating a negative value). In some cases, information transmitted with the power headroom reports based on low latency power boosting may be transmitted in addition to the information included in conventional power headroom reports.

In some cases, the power headroom report for low latency communications may be transmitted either on a low latency shared channel or on an MBB shared channel. In some cases, the power headroom report may be transmitted in a MAC CE. For example, UE 115-b may transmit a MAC CE carrying the power headroom report for low latency communications to indicate whether power boosting is available. If the power headroom report MAC CE is transmitted on an actual low latency shared channel (e.g., an actual URLLC PUSCH), the power headroom report may be an example of an actual power headroom report. If the power headroom report MAC CE is transmitted on an eMBB uplink shared channel (e.g., an eMBB PUSCH), the power headroom report MAC CE may indicate a virtual power headroom report for low latency communications. Additionally, the power headroom report triggered based on power boosting may be configured for single entry power headroom report formats or multi-entry power headroom report formats. For example, UE 115-a may transmit a low latency-based power headroom report for individual cells (e.g., includes a single value indicating power headroom for a particular cell), or UE 115-a may transmit low latency-based power headroom reports for each configured uplink carrier.

The wireless communications system 200 may implement techniques to prioritize power headroom reports for low latency communications. In some cases, UE 115-a may be prohibited from transmitting a power headroom report for eMBB-only uplink carriers on a low latency uplink shared channel. The prohibition may be configured or controlled via logical channel prioritization. UE 115-a may be able to transmit a power headroom report for low latency carriers on either a low latency uplink shared channel or an eMBB uplink shared channel. Therefore, power headroom reports for low latency communications may be transmitted using any configured carrier (e.g., eMBB carriers or URLLC carriers), but power headroom reports for MBB communications may be transmitted on MBB carriers (e.g., and not low latency carriers).

In some examples, when UE 115-a reports power headroom for low latency communications, UE 115-a may report the power headroom for PUSCH transmissions (e.g., virtual or actual). In some examples, UE 115-a may not report power headroom based on SRS transmissions when reporting power headroom for low latency communications. When a power headroom report for low latency communications is triggered on a serving cell, the power headroom may be computed for an uplink shared channel transmission (e.g., a low latency PUSCH transmission) on that cell. In some cases, UE 115-a may not include a power headroom report for a cell that is computed based on SRS transmission in an uplink PUSCH transmission.

In some cases, the wireless communications system 200 may support a format of power headroom report that is configured to carry information for carriers that are configured with low latency uplink transmissions. For example, the low latency power headroom report 210 may have a format which is configured specifically to convey at least power headroom information for low latency communications. In some cases, this format may only contain the power headroom reports for carriers that are configured with low latency uplink transmissions, such as URLLC PUSCH transmissions or URLLC PUCCH transmissions.

In some cases, low latency power headroom report 210 may be based on parameters associated with the low latency communications. For example, UE 115-a may be configured with a power factor change threshold which is based on low latency communications. The power factor change threshold for an URLLC carrier may be smaller than a power factor change threshold for an eMBB carrier. In comparison, some conventional power headroom reporting techniques may use just one parameter configured for a PUCCH group. UE 115-a may also be configured with a periodic timer for reporting low latency power headroom. The periodic timer for reporting low latency power headroom on a low latency uplink carrier may be smaller than the periodic timer for reporting power headroom for an eMBB carrier. For example, low latency power headroom reports 210 may be transmitted more frequently than eMBB power headroom reports 205. Additionally, low latency power headroom reporting may have a separate prohibit timer. The prohibit timer for low latency power headroom reporting on a low latency carrier may be configured to be smaller than a prohibit timer for an eMBB carrier. The parameters for triggering a power headroom report may generally be adjusted to be smaller for reporting URLLC headroom than reporting eMBB headroom, thereby permitting more frequent reporting of URLLC power headroom.

In some wireless communications systems, a UE 115 may be configured with two power control loops, and the transmission power may be accumulated separately for the two loops. If the UE 115 is configured with both URLLC and eMBB uplink transmissions, the UE 115 may use the two power control loops for URLLC and eMBB, respectively. In some cases, the UE 115 may be configured for uplink URLLC and uplink eMBB communications on a single serving cell. When the UE 115 reports power headroom for the serving cell, the UE 115 may only report the power headroom for a single power control loop, which may not be sufficient for a base station 105 that supports both URLLC and eMBB services.

Therefore, UE 115-a and base station 105-a may support power headroom reporting for both power control loops. In the power headroom report, UE 115-a may include fields which indicate the power headroom of the low latency communications power control loop. In some cases, the new field may be an octet of bits. For each serving cell configured with both URLLC and eMBB, the power headroom report may include two power headroom fields, one for each power control loop. Examples of fields for reporting the power headroom for both power control loops are shown by Table 2 below, where PC may stand for power control. In some cases, the fields of Table 2 may be appended to a power headroom report generated based on the fields of Table 1, or UE 115-a may transmit a power headroom report with just fields based on Table 2. The values V1 and V2 may indicate whether the power headroom reported for power control loops 1 and 2, respectively, are virtual transmissions or actual transmissions.

TABLE 2

| P | V1 | PH (Type X, serving cell n, PC loop 1) |
|---|----|----------------------------------------|
| V2 | R | PH (Type X, serving cell n, PC loop 2) |
| R | R | $P_{CMAX,f,c}^m$ |

In an example, UE 115-a may transmit the power headroom report on a PUSCH that is associated with the first power control loop. UE 115-a may use the actual power headroom for the first power control loop and use a virtual power headroom for the second power control loop (e.g., formatted according to Table 2). In another example, UE 115-a may transmit the power headroom report on a PUSCH that is associated with the second power control loop. UE 115-a may use the actual power headroom for the second power control loop and use a virtual power headroom for the first power control loop (e.g., formatted according to Table 2).

In some cases, UE 115-a may be triggered to report power headroom for both eMBB and URLLC when an eMBB power headroom report is triggered. In some cases, UE 115-a may report just URLLC power headroom (e.g., and not eMBB power headroom) when URLLC power headroom is triggered. Therefore, URLLC power headroom may be reported whenever eMBB power headroom is reported, but eMBB power headroom may not always be reported when URLLC power headroom is reported. The power headroom report conveying URLLC power headroom may be transmitted on an eMBB uplink shared channel or a URLLC uplink shared channel. For example, the URLLC power headroom may be reported using whichever uplink shared channel is scheduled first.

URLLC power headroom reporting may similarly support virtual power headroom reporting. For example, UE 115-a may detect a trigger to report URLLC power headroom, but UE 115-a may not have a URLLC PUSCH assignment. Therefore, the power headroom of the associated power control loop or transmit power control accumulation (e.g., associated with URLLC) may be reported.

In an example, UE 115-a may be configured for both URLLC and eMBB communications with base station 105-a on an uplink carrier. UE 115-a may support power boosting a transmission power of low latency communications when low latency communications resources are multiplexed with eMBB resources. UE 115-a may detect a trigger to transmit a power headroom report. In some cases, the trigger may be a trigger to report an eMBB power headroom report 205. Or, in some cases, the trigger may be a trigger to report a URLLC power headroom report 210. Some examples of triggers to report the URLLC power headroom report 210 may include a first event (e.g., configuration or re-configuration of power-boosting functionality), a second event (e.g., if UE 115-a detects that there is insufficient headroom for power boosting), or a third event (e.g., if UE 115-a detects a change in the amount of power headroom such that there becomes enough power headroom for power boosting).

Additionally, or alternatively, UE 115-a may be configured with power headroom report parameters for URLLC. For example, UE 115-a may be configured with a power factor change parameter for reporting URLLC power headroom, a periodic timer parameter for reporting URLLC power headroom, and a prohibit timer for reporting URLLC power headroom. UE 115-a may be configured with these parameters in addition to corresponding parameters for transmitting an eMBB power headroom report.

UE 115-a may then generate a power headroom report to indicate the power headroom for URLLC on the uplink carrier. The power headroom report, conveying URLLC power headroom, may have a new format or be a new type of power headroom report. For example, the power headroom value indicated in the report may be based on a largest configured power boosting transmission power.

UE 115-a may transmit the power headroom for URLLC in both a URLLC power headroom report 210 and an eMBB power headroom report 205. In some cases, eMBB power headroom may just be transmitted in the eMBB power headroom report 205. In some examples, UE 115-a may be configured with two transmit power control loops. UE 115-a may use one transmit power control loop for URLLC and the other transmit power control loop for eMBB. UE 115-a may include fields to indicate the power headroom for both transmit power control loops in the power headroom report.

Base station 105-a may receive the power headroom report including power headroom measurement for the URLLC carrier. In some cases, base station 105-a may modify the transmit power at UE 115-a based on the power headroom report. For example, base station 105-a may transmit control signaling, such as a transmit power control, to adjust the uplink transmit power at UE 115-a. In some cases, the transmit power control may indicate to adjust an uplink transmit power for a first control loop (e.g., for eMBB communications), a second control loop (e.g., for URLLC), or both. In some cases, base station 105-a may schedule UE 115-a based on the power headroom report. For example, if UE 115-a indicates that power boosting is not available, base station 105-a may prevent from scheduling UE 115-a for URLLC uplink on resources which overlap with eMBB transmissions.

Figure 3:
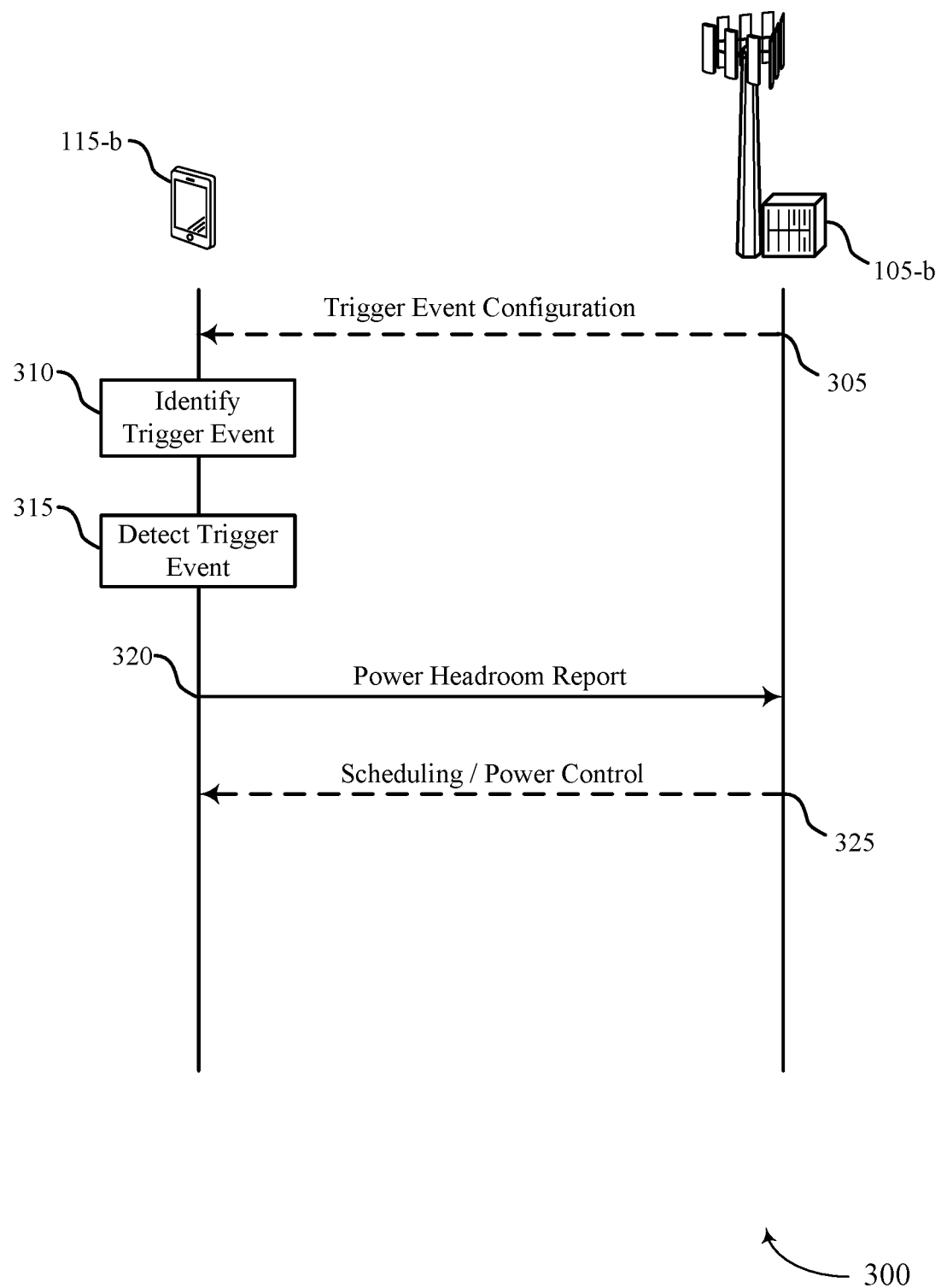
FIG. 3 illustrates an example of a process flow that supports power headroom report enhancement in accordance with aspects of the present disclosure.

FIG. 3 illustrates an example of a process flow 300 that supports power headroom report enhancement in accordance with aspects of the present disclosure. In some examples, the process flow 300 may implement aspects of wireless communication system 100. The process flow 300 may include UE 115-b and base station 105-b, which may be examples of a UE 115 and a base station 105 as described with reference to FIG. 1. UE 115-b and base station 105-b may support techniques for reporting URLLC power overhead to support URLLC power boosting.

In some cases, at 305, base station 105-b may transmit a trigger event configuration for power headroom reporting for a first service type that has a lower latency condition and a higher reliability condition than a second service type. URLLC may be an example of the first service type, and eMBB may be an example of the second service type.

In some cases, the trigger event configuration indicates to detect a trigger event for power headroom reporting for the first service type based on receiving a power boosting functionality configuration or a power boosting functionality reconfiguration for the first service type. For example, UE 115-b may trigger a power headroom report upon configuration or reconfiguration of power boosting in an upper layer, such as RRC.

In some cases, the trigger event configuration indicates to detect a trigger event for power headroom reporting for the first service type based on lacking sufficient headroom for power boosting the first service type. In some cases, a power headroom report triggered by lacking sufficient headroom may include negative values to indicate how much additional headroom would enable power boosting.

In some cases, the trigger event configuration indicates to detect a trigger event for power headroom reporting for the first service type based on detecting a transition from lacking sufficient headroom for power boosting for the first service type to having sufficient headroom for power boosting for the first service type. In some cases, a power headroom report triggered by switching to having sufficient headroom may include positive values to indicate how additional, or excess, headroom is available after power boosting.

In some cases, the trigger event configuration indicates to detect a trigger event for power headroom reporting for the first service type based on detecting a path loss change that satisfies a path loss threshold for the first service type. In some cases, detecting the path loss change may be based on a path loss threshold, or power factor change threshold, that is specific to the first type of service type.

In some cases, the trigger event configuration indicates to detect a trigger event for power headroom reporting for the first service type based on detecting that a timer associated with the first service type has expired. In some cases, the timer associated with the service type may be smaller than a corresponding timer associated with the second service type. For example, the periodicity of a periodic timer configured for a URLLC carrier may be smaller than the periodicity of a periodic timer configured for an eMBB carrier, such that the power headroom reporting for the first service type occurs more frequently.

In some cases, the trigger event configuration indicates to detect a trigger event for power headroom reporting for the first service type based on detecting a second trigger event for power headroom reporting for the second service type. For example, a trigger to transmit an eMBB power headroom report may also trigger a URLLC power headroom report.

In some cases, at 310, UE 115-*b* may identify a trigger event configuration for power headroom reporting for the first service type. In some cases, the trigger event configuration may be received from base station 105-*b*. In some cases, the trigger event configuration may be retrieved from a storage device of UE 115-*b*. For example, UE 115-*b* may be pre-configured with one or more of the trigger event configurations.

At 315, UE 115-*b* may detect a trigger event for power headroom reporting for the first service type. For example, UE 115-*b* may detect the trigger event based on the trigger event configuration. UE 115-*b* may measure the power headroom for the first service type based on detecting the trigger event. The power headroom for the first service type may be, for example, a difference between a transmission power for the first service type and a maximum transmit power for the first service type.

At 320, UE 115-*b* may transmit a power headroom report for the first service type based on detecting the trigger event. In some cases, UE 115-*b* may transmit the power headroom report including a power headroom value that is associated with a power boosting functionality for the first service type. In some cases, UE 115-*b* may transmit the power headroom report including a power headroom value that is calculated based on a configured power boosting value. In some cases, UE 115-*b* may transmit a MAC CE including the power headroom report on a first uplink shared channel for the first service type, a second uplink shared channel for the second service type, or both.

In some cases, UE 115-*b* may transmit the power headroom report including a power headroom value that is calculated based on a configured power boosting value. For example, the power headroom calculation may be based on accounting for the largest configured power boosting value. In some examples, by considering the largest configured power boosting value, the power headroom value may be negative if UE 115-*b* cannot apply power boosting or positive if UE 115-*b* can apply power boosting. In some cases, the power headroom value may be calculated for at least one carrier configured for the first service type. In some cases, the power headroom report may indicate a set of power headroom values that respectively correspond to a set of carriers. For example, UE 115-*b* may support a single entry power headroom report for a single cell (e.g., the primary cell) or a multi-power headroom report, reporting for multiple (e.g., all configured or a select set of) cells.

In some cases, UE 115-*b* may transmit the power headroom report that indicates a first power headroom for a first power control loop associated with the first service type and a second power headroom for a second power control loop associated with the second service type. For example, UE 115-*b* may have two power control loops, and UE 115-*b* may use one power control loop for URLLC and one power control loop for eMBB communications. In some cases, the power headroom report may include a first power headroom field for the first power control loop and a second power headroom field for the second power control loop.

In some cases, the power headroom report may include virtual power headroom measurements for cells of the first service type which are not scheduled for an uplink shared channel. For example, UE 115-*b* may perform an estimate of the uplink transmit power for URLLC cells which are not scheduled for PUSCH. In some cases, UE 115-*b* may report the power headroom based on the power control loop associated with the first service type for the cell.

At 325, base station 105-*b* may receive the power headroom report including the power headroom value that is calculated based on the configured power boosting value. In some cases, base station 105-*b* may schedule UE 115-*b* based on the power headroom report. For example, if the power headroom report indicates that UE 115-*b* has sufficient power headroom to perform power boosting, base station 105-*b* may schedule UE 115-*b* on URLLC resources which overlap with uplink eMBB transmissions. Or, if the power headroom report indicates that UE 115-*b* does not have sufficient power headroom to perform power boosting, base station 105-*b* may refrain from scheduling UE 115-*b* on URLLC resources which overlap uplink eMBB transmissions.

In some cases, base station 105-*b* may transmit control signaling to adjust a transmit power at UE 115-*b*. For example, base station 105-*b* may transmit a power control command for one or more power control loops at UE 115-*b*. In cases where UE 115-*b* uses one power control loop for each of the first service type and the second service type, base station 105-*b* may transmit a transmit power control signal to adjust the transmit power for the transmit power loop associated with the first service type. In some cases, the transmit power command may adjust the transmit power for uplink URLLC at UE 115-*b* such that UE 115-*b* can perform power boosting.

Figure 4:
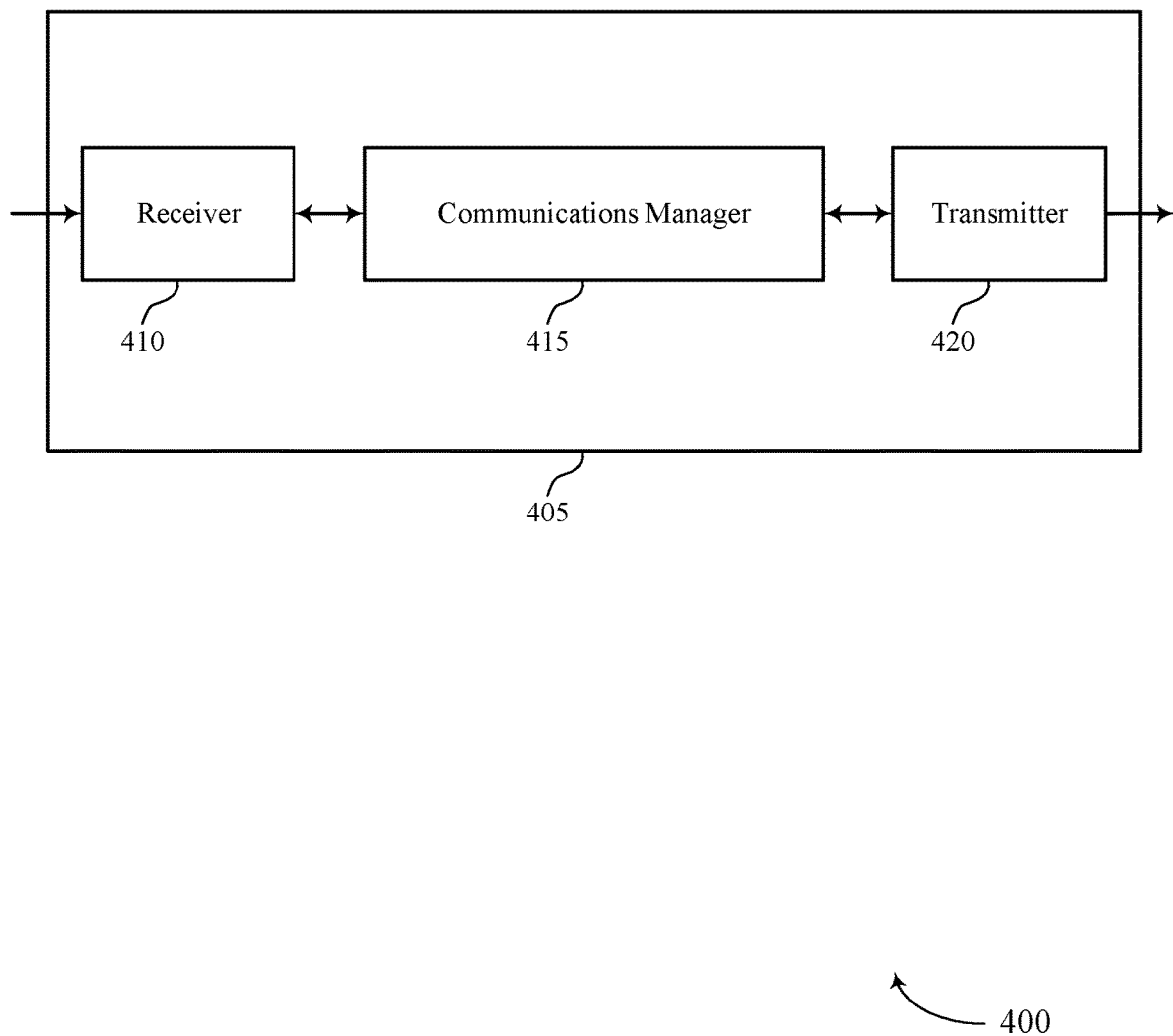
FIGS. 4 and 5 show block diagrams of devices that support power headroom report enhancement in accordance with aspects of the present disclosure.

FIG. 4 shows a block diagram 400 of a device 405 that supports power headroom report enhancement in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to power headroom report enhancement). Information may be passed on to other components of the device 405. The receiver 410 may be an example of aspects of the transceiver 720 described with reference to FIG. 7. The receiver 410 may utilize a single antenna or a set of antennas.

The communications manager 415 may detect a trigger event for power headroom reporting for a first service type that has a lower latency condition and a higher reliability condition than a second service type and transmit a power headroom report for the first service type based on detecting the trigger event. In some cases, the communications manager 415 may identify a trigger event configuration for power headroom reporting for the first service type. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 415 as described herein may be implemented to realize one or more potential advantages. One implementation may allow a UE 115 to more frequently perform power boosting for low latency transmissions. By transmitting a power headroom report which considers low latency power boosting to a serving base station 105, the serving base station 105 may be able to either make informed scheduling decisions or adjust the transmit power of the UE 115. Then, in some cases, the UE 115 may avoid being scheduled for low latency transmissions on resources which overlap MBB uplink transmissions. Additionally, or alternatively, the base station 105 may manage, and sometimes adjust, the uplink transmit power of the UE 115 so that the UE 115 can perform power boosted low latency transmissions. This may improve throughput for the UE 115, as the uplink low latency transmissions from the UE 115 may not be affected, or may be affected less, by eMBB transmissions.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
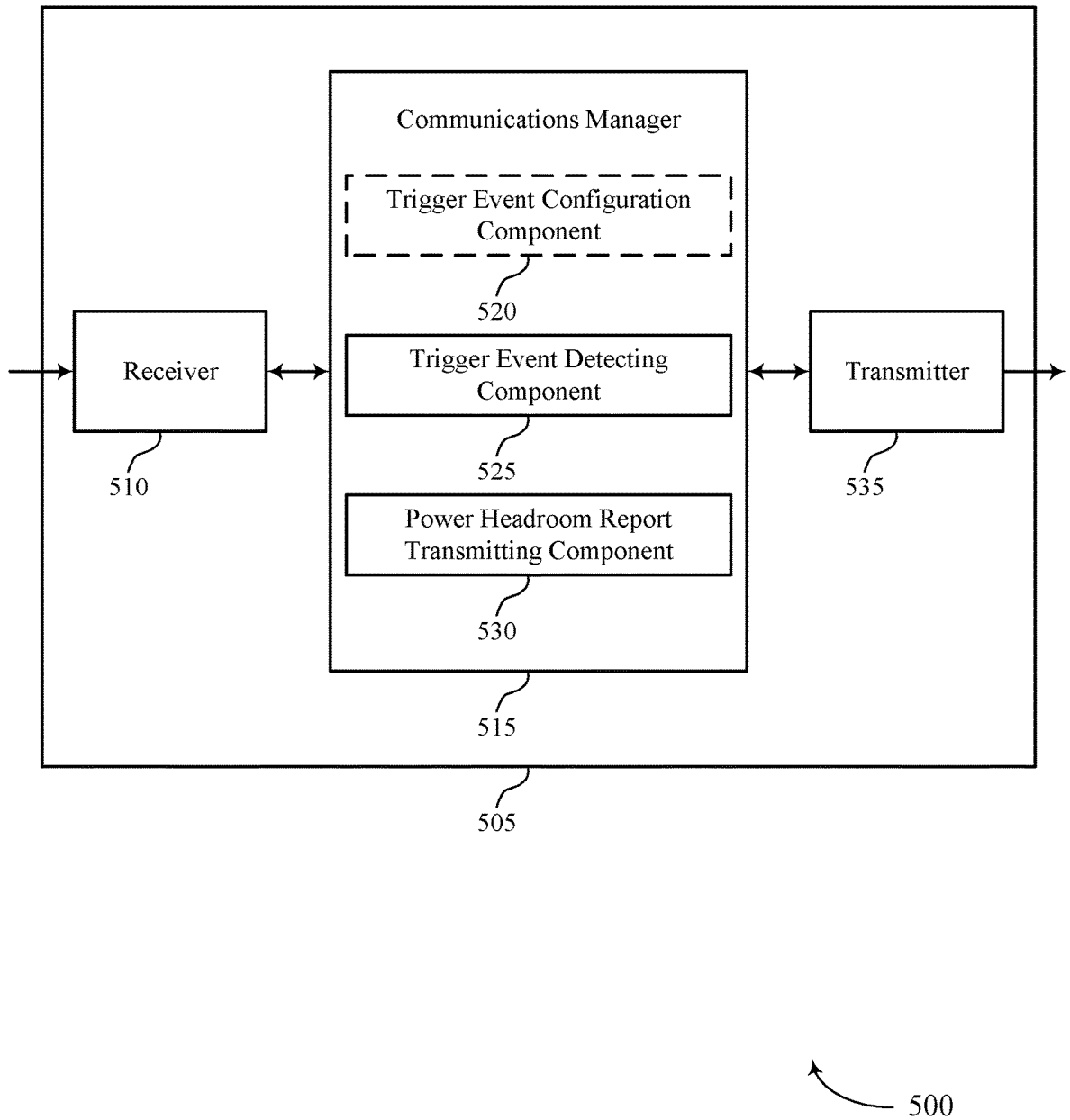

FIG. 5 shows a block diagram 500 of a device 505 that supports power headroom report enhancement in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to power headroom report enhancement). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a trigger event detecting component 525 and a power headroom report transmitting component 530. In some cases, the communications manager 515 may include a trigger event configuration component 520. The communications manager 515 may be an example of aspects of the communications manager 710 described herein.

In some cases, the trigger event configuration component 520 may identify a trigger event configuration for power headroom reporting for a first service type that has a lower latency condition and a higher reliability condition than a second service type.

The trigger event detecting component 525 may detect a trigger event for power headroom reporting for the first service type. In some cases, the trigger event may be detected based on the trigger event configuration.

The power headroom report transmitting component 530 may transmit a power headroom report for the first service type based on detecting the trigger event.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
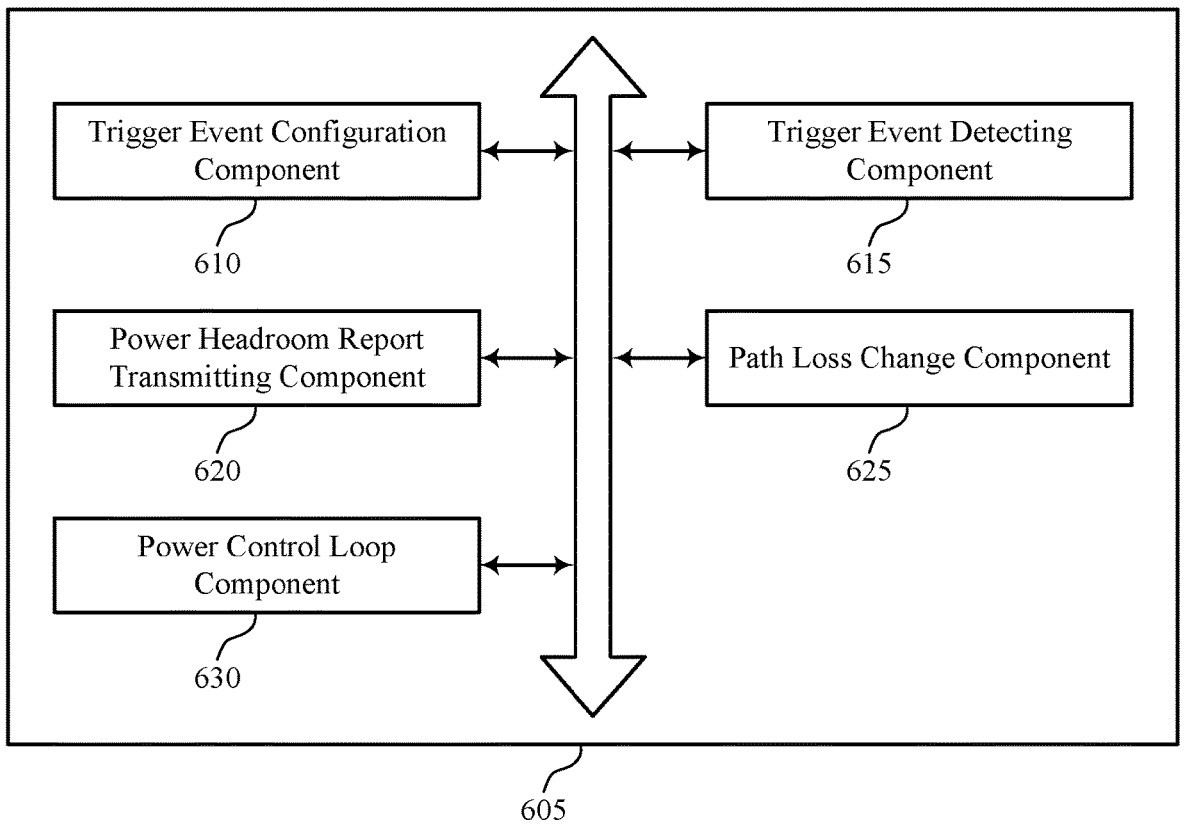
FIG. 6 shows a block diagram of a communications manager that supports power headroom report enhancement in accordance with aspects of the present disclosure.

FIG. 6 shows a block diagram 600 of a communications manager 605 that supports power headroom report enhancement in accordance with aspects of the present disclosure. The communications manager 605 may be an example of aspects of a communications manager 415, a communications manager 515, or a communications manager 710 described herein. The communications manager 605 may include a trigger event configuration component 610, a trigger event detecting component 615, a power headroom report transmitting component 620, a path loss change component 625, and a power control loop component 630. Each of these modules may communicate, directly or indirectly, with one another (e.g., via one or more buses).

The trigger event configuration component 610 may identify a trigger event configuration for power headroom reporting for a first service type that has a lower latency condition and a higher reliability condition than a second service type.

In some examples, the trigger event configuration component 610 may receive, from a base station, the trigger event configuration. In some examples, the trigger event configuration component 610 may retrieve the trigger event configuration from a storage device of the UE.

In some examples, the trigger event configuration component 610 may identify the trigger event configuration for the first service type that indicates to detect the trigger event based on receiving a power boosting functionality configuration or a power boosting functionality reconfiguration for the first service type. In some examples, the trigger event configuration component 610 may identify the trigger event configuration for the first service type that indicates to detect the trigger event based on detecting that the UE lacks sufficient headroom for power boosting for the first service type. In some examples, the trigger event configuration component 610 may identify the trigger event configuration for the first service type that indicates to detect the trigger event based on detecting that the UE lacks sufficient headroom for power boosting for the first service type and based at least in part on detecting that a prohibit timer at the UE has expired. In some cases, receiving a power boosting functionality configuration or a power boosting functionality reconfiguration includes receiving a configuration or a reconfiguration of a Radio Resource Control power control parameter or receiving a configuration of an open-loop power control parameter set indication in downlink control information.

In some examples, the trigger event configuration component 610 may identify the trigger event configuration for the first service type that indicates to detect the trigger event based on detecting that the UE has transitioned from lacking sufficient headroom for power boosting for the first service type to having sufficient headroom for power boosting for the first service type. In some examples, the trigger event configuration component 610 may identify the trigger event configuration for the first service type that indicates to detect the trigger event based on detecting that the UE has transitioned from lacking sufficient headroom for power boosting for the first service type to having sufficient headroom for power boosting for the first service type and based at least in part on detecting that a prohibit timer at the UE has expired. In some examples, the trigger event configuration component 610 may identify the trigger event configuration for the first service type that indicates to detect the trigger event based on detecting that a timer associated with the first service type has expired.

In some examples, the trigger event configuration component 610 may identify the trigger event configuration for the first service type that indicates to detect the trigger event based on detecting a second trigger event for power headroom reporting for the second service type.

The trigger event detecting component 615 may detect a trigger event for power headroom reporting for the first service type. In some examples, the trigger event detecting component 615 may detect the trigger event based on the trigger event configuration.

The power headroom report transmitting component 620 may transmit a power headroom report for the first service type based on detecting the trigger event. In some examples, the power headroom report transmitting component 620 may transmit the power headroom report that is associated with power boosting functionality for the first service type.

In some examples, the power headroom report transmitting component 620 may transmit the power headroom report including a power headroom value that is calculated based on a configured power boosting value. In some cases, the configured power boosting value is a largest configured power boosting value in a set of configured power boosting values.

In some examples, the power headroom report transmitting component 620 may transmit a MAC CE including the power headroom report on a first uplink shared channel for the first service type, a second uplink shared channel for the second service type, or both. In some examples, the power headroom report transmitting component 620 may transmit the power headroom report that indicates a power headroom value corresponding to a single carrier.

In some examples, the power headroom report transmitting component 620 may transmit the power headroom report that indicates a set of power headroom values that respectively correspond to a set of carriers. In some examples, the power headroom report transmitting component 620 may transmit the power headroom report on a first uplink shared channel for the first service type.

In some examples, the power headroom report transmitting component 620 may detect a second trigger event for power headroom reporting for the second service type. In some examples, the power headroom report transmitting component 620 may refrain from transmitting a second power headroom report for the second service type on an uplink shared channel for the first service type.

In some examples, the power headroom report transmitting component 620 may transmit the power headroom report that indicates a power headroom value calculated for at least one carrier configured for the first service type. In some examples, the power headroom report transmitting component 620 may transmit the power headroom report on a second uplink shared channel configured for the second service type.

In some examples, the power headroom report transmitting component 620 may transmit the power headroom report on an earlier of a first uplink shared channel configured for the first service type or a second uplink shared channel configured for the second service type. In some cases, the power headroom report does not include a power headroom value calculated for any carrier configured for the second service type and not the first service type. In some cases, the power headroom report is an actual power headroom report, a virtual power headroom report, or both.

The path loss change component 625 may identify the trigger event configuration for the first service type that indicates to detect the trigger event based on detecting a path loss change that satisfies a path loss threshold for the first service type. In some cases, the path loss threshold for the first service type is smaller than a path loss threshold for the second service type. In some cases, a duration of the timer associated with the first service type is shorter than a duration of a timer associated with the second service type. In some cases, the timer associated with the first service type is a periodic timer or a prohibition timer.

The power control loop component 630 may transmit the power headroom report that indicates a first power headroom for a first power control loop associated with the first service type and a second power headroom for a second power control loop associated with the second service type. In some cases, the power headroom report includes a first power headroom field for the first power control loop and a second power headroom field for the second power control loop. In some cases, the first power control loop and the second power control loop are configured for a same uplink carrier.

Figure 7:
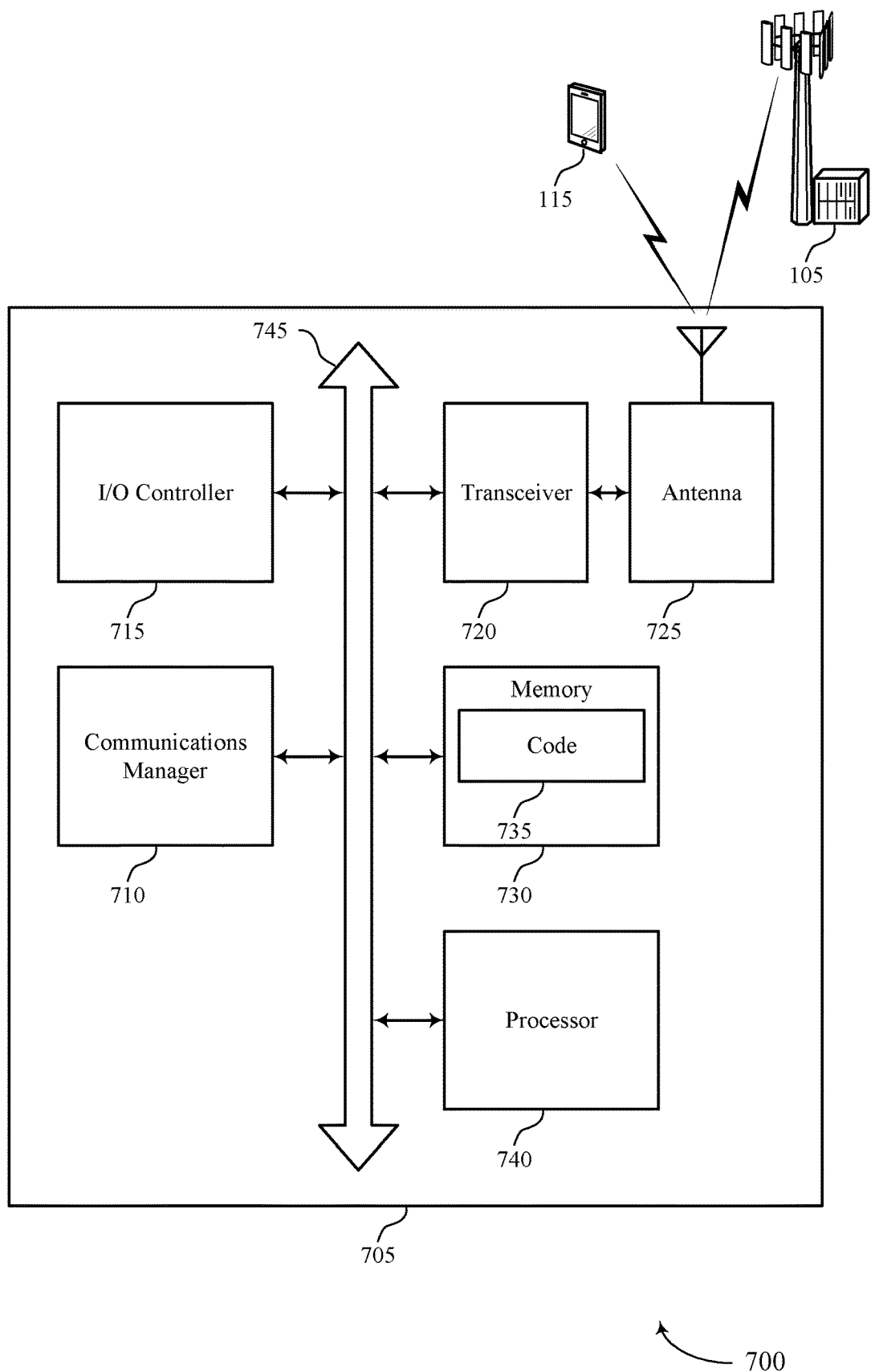
FIG. 7 shows a diagram of a system including a device that supports power headroom report enhancement in accordance with aspects of the present disclosure.

FIG. 7 shows a diagram of a system 700 including a device 705 that supports power headroom report enhancement in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a trigger event configuration for power headroom reporting for a first service type that has a lower latency condition and a higher reliability condition than a second service type, detect a trigger event for power headroom reporting for the first service type based on the trigger event configuration, and transmit a power headroom report for the first service type based on detecting the trigger event.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The actions performed by the communications manager 710 as described herein may be implemented to realize one or more potential advantages at components of the device 705. For example, by sending power headroom reports which consider power boosting, the transmit power efficiency at the device 705 may increase. For example, the device 705 may receive signaling from a scheduling base station 105 which includes a transmit power control indication. The processor 740 may the send signaling to the transceiver 720 to adjust a transmit power to a more efficient value, such that the device 705 can efficiently perform power boosting for low latency transmissions.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting power headroom report enhancement).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
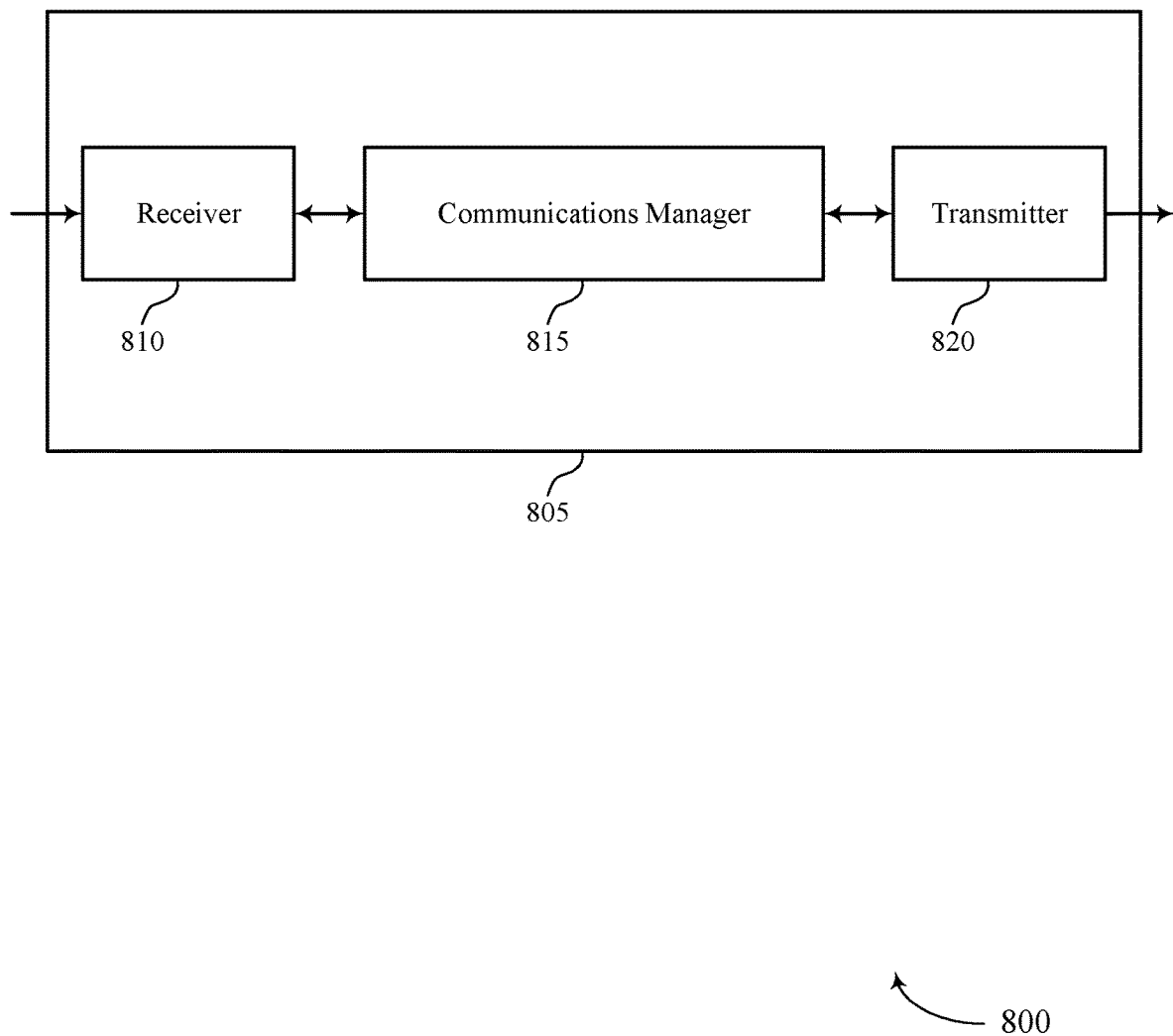
FIGS. 8 and 9 show block diagrams of devices that support power headroom report enhancement in accordance with aspects of the present disclosure.

FIG. 8 shows a block diagram 800 of a device 805 that supports power headroom report enhancement in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to power headroom report enhancement). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, a trigger event configuration for power headroom reporting for a first service type that has a lower latency condition and a higher reliability condition than a second service type and receive, from the UE, a power headroom report for the first service type based on the trigger event configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
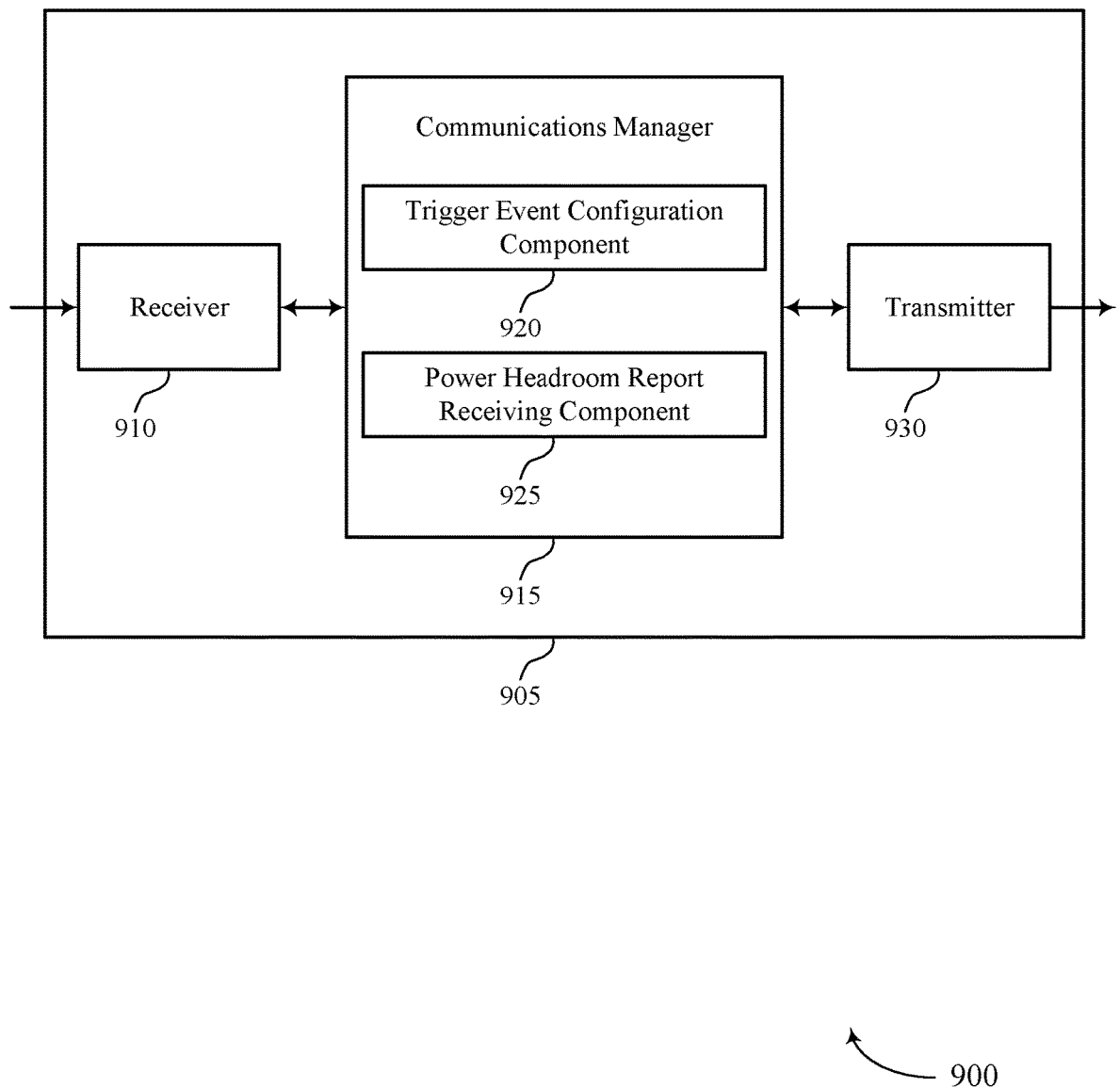

FIG. 9 shows a block diagram 900 of a device 905 that supports power headroom report enhancement in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to power headroom report enhancement). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a trigger event configuration component 920 and a power headroom report receiving component 925. The communications manager 915 may be an example of aspects of the communications manager 1110 described herein.

The trigger event configuration component 920 may transmit, to a UE, a trigger event configuration for power headroom reporting for a first service type that has a lower latency condition and a higher reliability condition than a second service type. The power headroom report receiving component 925 may receive, from the UE, a power headroom report for the first service type based on the trigger event configuration.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
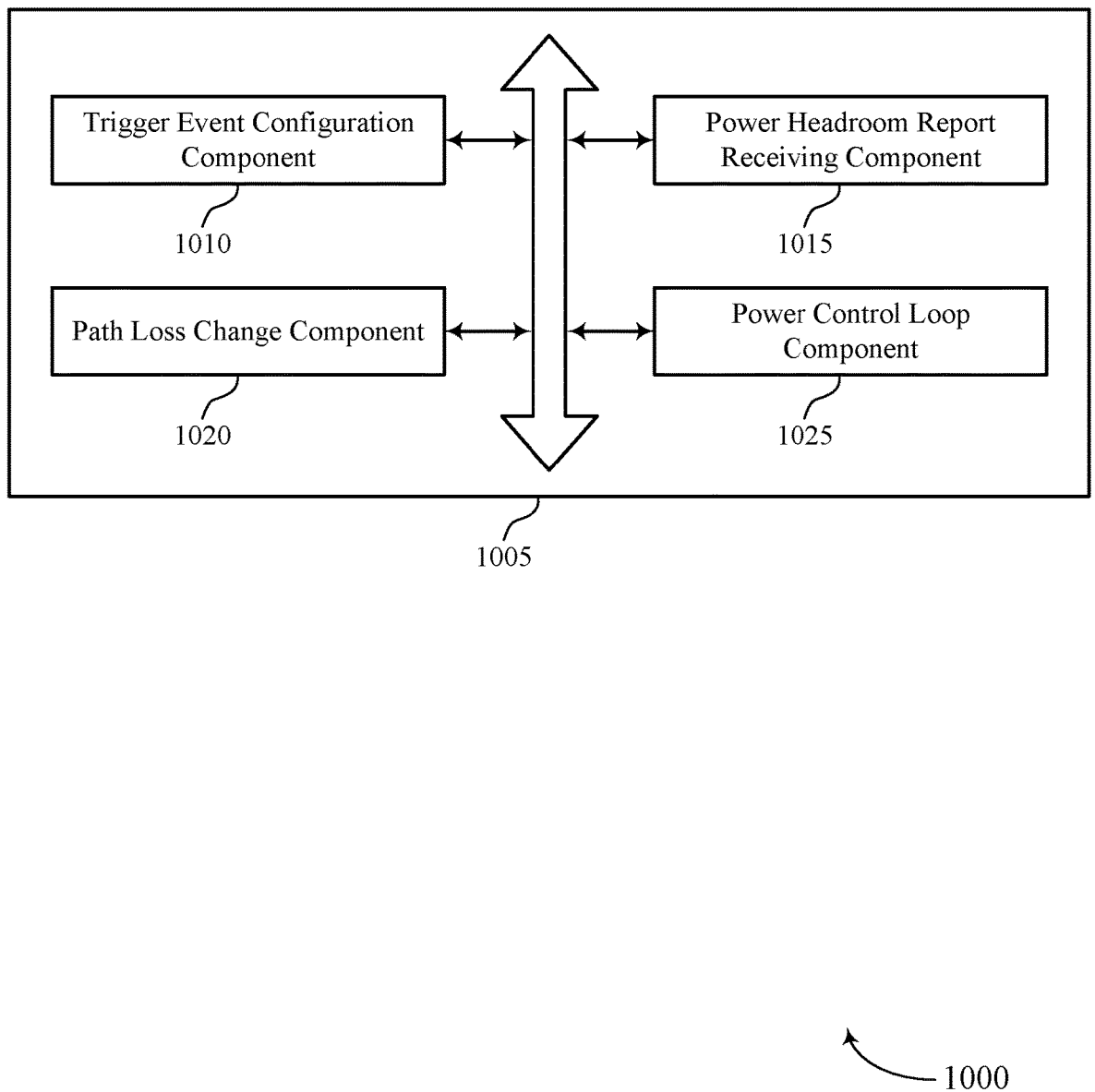
FIG. 10 shows a block diagram of a communications manager that supports power headroom report enhancement in accordance with aspects of the present disclosure.

FIG. 10 shows a block diagram 1000 of a communications manager 1005 that supports power headroom report enhancement in accordance with aspects of the present disclosure. The communications manager 1005 may be an example of aspects of a communications manager 815, a communications manager 915, or a communications manager 1110 described herein. The communications manager 1005 may include a trigger event configuration component 1010, a power headroom report receiving component 1015, a path loss change component 1020, and a power control loop component 1025. Each of these modules may communicate, directly or indirectly, with one another (e.g., via one or more buses).

The trigger event configuration component 1010 may transmit, to a UE, a trigger event configuration for power headroom reporting for a first service type that has a lower latency condition and a higher reliability condition than a second service type. In some examples, the trigger event configuration component 1010 may transmit the trigger event configuration that indicates to detect a trigger event for power headroom reporting for the first service type based on receiving a power boosting functionality configuration or a power boosting functionality reconfiguration for the first service type.

In some examples, the trigger event configuration component 1010 may transmit the trigger event configuration that indicates to detect a trigger event for power headroom reporting for the first service type based on lacking sufficient headroom for power boosting for the first service type and based on a prohibit timer at the UE being expired. In some examples, the trigger event configuration component 1010 may transmit the trigger event configuration that indicates to detect a trigger event for power headroom reporting for the first service type based on detecting a transition from lacking sufficient headroom for power boosting for the first service type to having sufficient headroom for power boosting for the first service type and based on a prohibit timer at the UE being expired.

In some examples, the trigger event configuration component 1010 may transmit the trigger event configuration that indicates to detect a trigger event for power headroom reporting for the first service type based on detecting that a timer associated with the first service type has expired. In some examples, the trigger event configuration component 1010 may transmit the trigger event configuration that indicates to detect a trigger event for power headroom reporting for the first service type based on detecting a second trigger event for power headroom reporting for the second service type.

In some examples, the trigger event configuration component 1010 may receive the power headroom report on a second uplink shared channel configured for the second service type. In some cases, a duration of the timer associated with the first service type is shorter than a duration of a timer associated with the second service type. In some cases, the timer associated with the first service type is a periodic timer or a prohibition timer.

The power headroom report receiving component 1015 may receive, from the UE, a power headroom report for the first service type based on the trigger event configuration. In some examples, the power headroom report receiving component 1015 may receive the power headroom report that is associated with power boosting functionality for the first service type.

In some examples, the power headroom report receiving component 1015 may receive the power headroom report including a power headroom value that is calculated based on a configured power boosting value. In some examples, the power headroom report receiving component 1015 may receive a MAC CE including the power headroom report on a first uplink shared channel for the first service type, a second uplink shared channel for the second service type, or both.

In some examples, the power headroom report receiving component 1015 may receive the power headroom report that indicates a power headroom value corresponding to a single carrier. In some examples, the power headroom report receiving component 1015 may receive the power headroom report that indicates a set of power headroom values that respectively correspond to a set of carriers.

In some examples, the power headroom report receiving component 1015 may receive the power headroom report on an uplink shared channel for the first service type. In some examples, the power headroom report receiving component 1015 may receive the power headroom report that indicates a power headroom value calculated for at least one carrier configured for the first service type.

In some examples, the power headroom report receiving component 1015 may receive the power headroom report on an earlier of a first uplink shared channel configured for the first service type or a second uplink shared channel configured for the second service type.

In some cases, the configured power boosting value is a largest configured power boosting value in a set of configured power boosting values. In some cases, the trigger event configuration indicates that the UE is prohibited from transmitting a second power headroom report for the second service type on an uplink shared channel for the first service type. In some cases, the power headroom report does not include a power headroom value calculated for any carrier configured for the second service type and not the first service type. In some cases, the power headroom report is an actual power headroom report, a virtual power headroom report, or both.

The path loss change component 1020 may transmit the trigger event configuration that indicates to detect a trigger event for power headroom reporting for the first service type based on detecting a path loss change that satisfies a path loss threshold for the first service type. In some cases, the path loss threshold for the first service type is smaller than a path loss threshold for the second service type.

The power control loop component 1025 may receive the power headroom report that indicates a first power headroom for a first power control loop associated with the first service type and a second power headroom for a second power control loop associated with the second service type. In some cases, the power headroom report includes a first power headroom field for the first power control loop and a second power headroom field for the second power control loop. In some cases, the first power control loop and the second power control loop are configured for a same uplink carrier.

Figure 11:
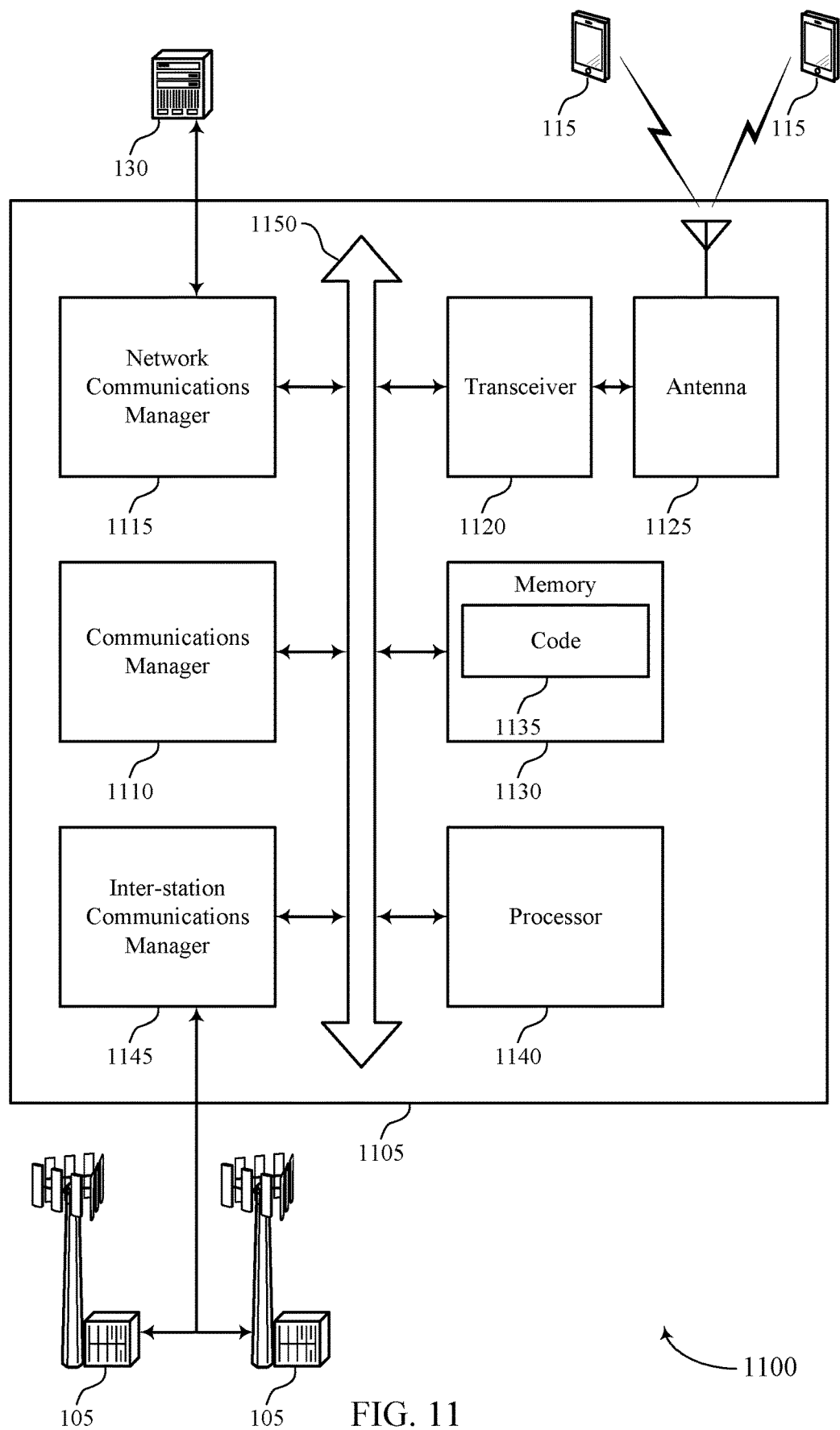
FIG. 11 shows a diagram of a system including a device that supports power headroom report enhancement in accordance with aspects of the present disclosure.

FIG. 11 shows a diagram of a system 1100 including a device 1105 that supports power headroom report enhancement in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, a trigger event configuration for power headroom reporting for a first service type that has a lower latency condition and a higher reliability condition than a second service type and receive, from the UE, a power headroom report for the first service type based on the trigger event configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting power headroom report enhancement).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
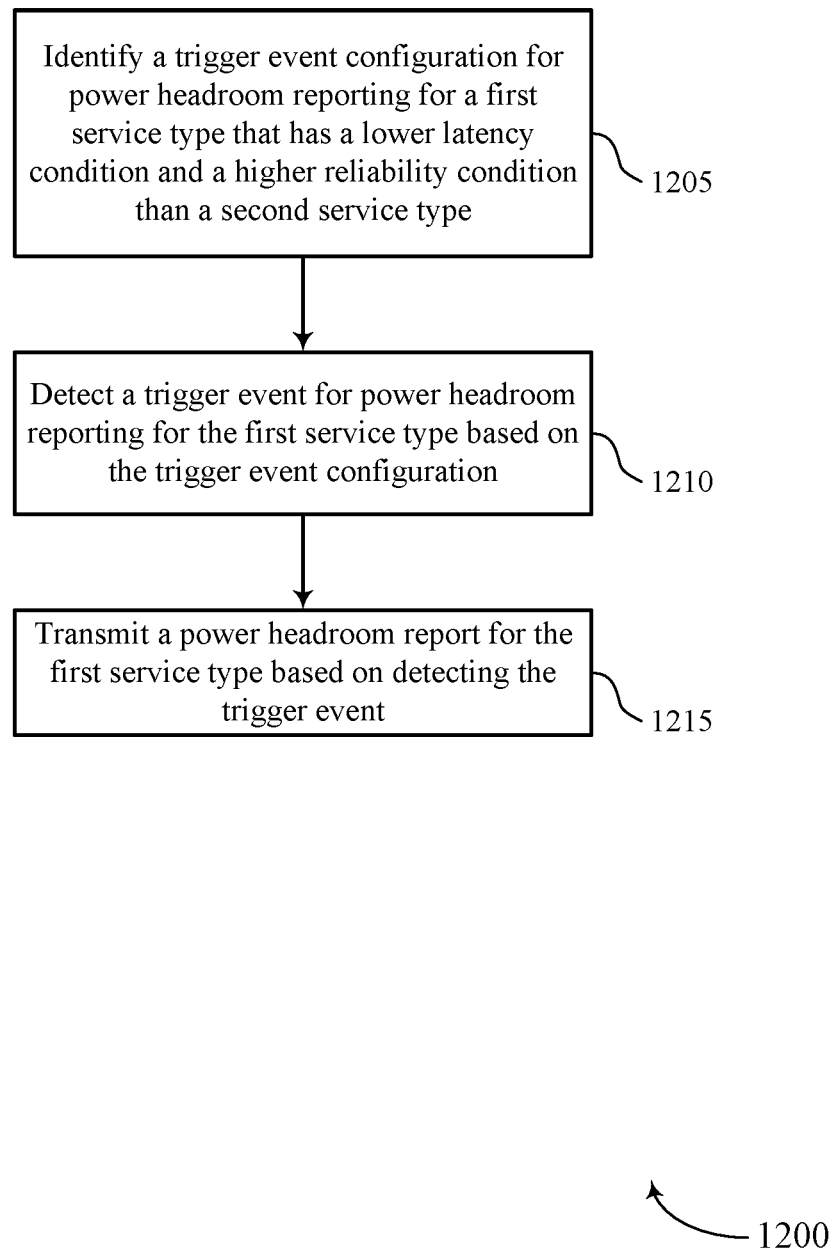
FIGS. 12 through 18 show flowcharts illustrating methods that support power headroom report enhancement in accordance with aspects of the present disclosure.

FIG. 12 shows a flowchart illustrating a method 1200 that supports power headroom report enhancement in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a trigger event configuration for power headroom reporting for a first service type that has a lower latency condition and a higher reliability condition than a second service type. The operations of 1205 may be performed according to the methods described herein. In some examples, aspects of the operations of 1205 may be performed by a trigger event configuration component as described with reference to FIGS. 4 through 7.

At 1210, the UE may detect a trigger event for power headroom reporting for the first service type based on the trigger event configuration. The operations of 1210 may be performed according to the methods described herein. In some examples, aspects of the operations of 1210 may be performed by a trigger event detecting component as described with reference to FIGS. 4 through 7.

At 1215, the UE may transmit a power headroom report for the first service type based on detecting the trigger event. The operations of 1215 may be performed according to the methods described herein. In some examples, aspects of the operations of 1215 may be performed by a power headroom report transmitting component as described with reference to FIGS. 4 through 7.

Figure 13:
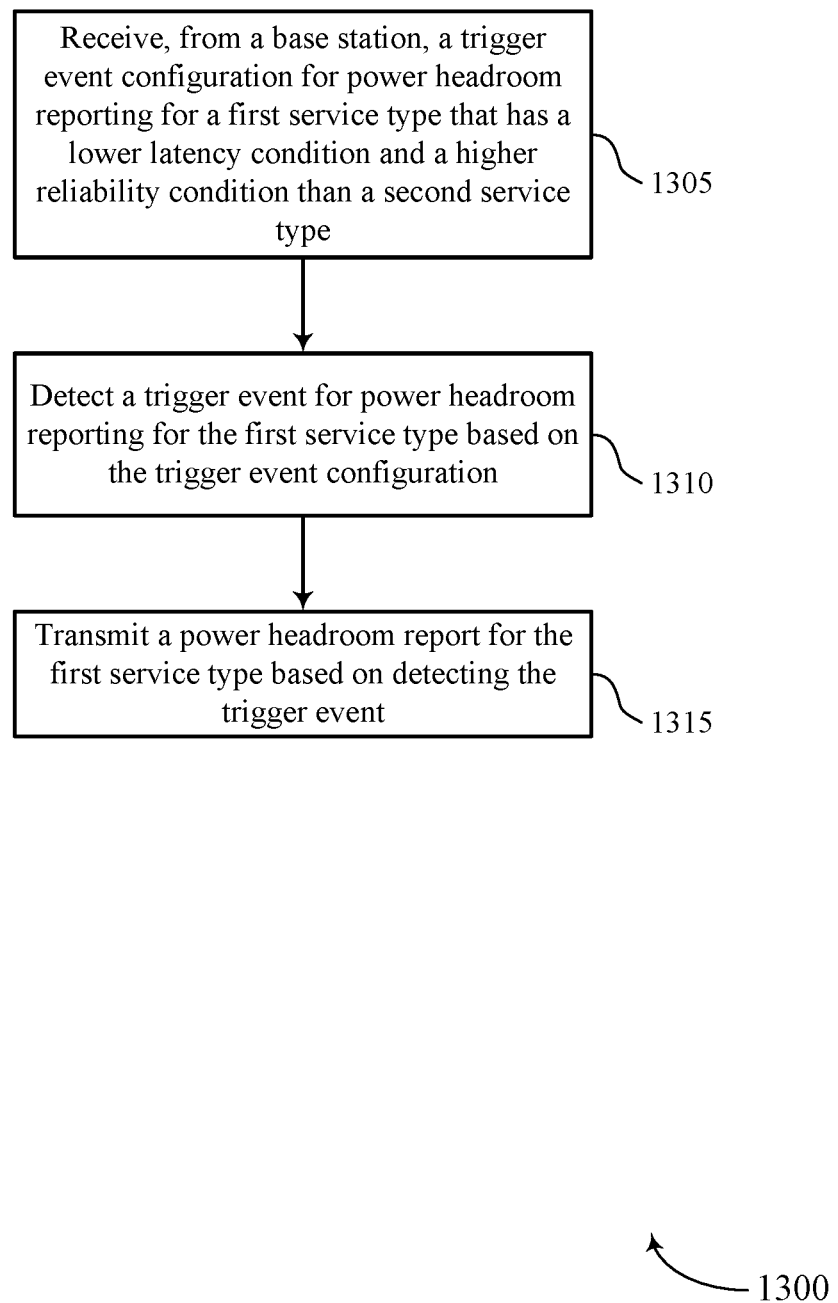

FIG. 13 shows a flowchart illustrating a method 1300 that supports power headroom report enhancement in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a trigger event configuration for power headroom reporting for a first service type that has a lower latency condition and a higher reliability condition than a second service type. The operations of 1305 may be performed according to the methods described herein. In some examples, aspects of the operations of 1305 may be performed by a trigger event configuration component as described with reference to FIGS. 4 through 7.

At 1310, the UE may detect a trigger event for power headroom reporting for the first service type based on the trigger event configuration. The operations of 1310 may be performed according to the methods described herein. In some examples, aspects of the operations of 1310 may be performed by a trigger event detecting component as described with reference to FIGS. 4 through 7.

At 1315, the UE may transmit a power headroom report for the first service type based on detecting the trigger event. The operations of 1315 may be performed according to the methods described herein. In some examples, aspects of the operations of 1315 may be performed by a power headroom report transmitting component as described with reference to FIGS. 4 through 7.

Figure 14:
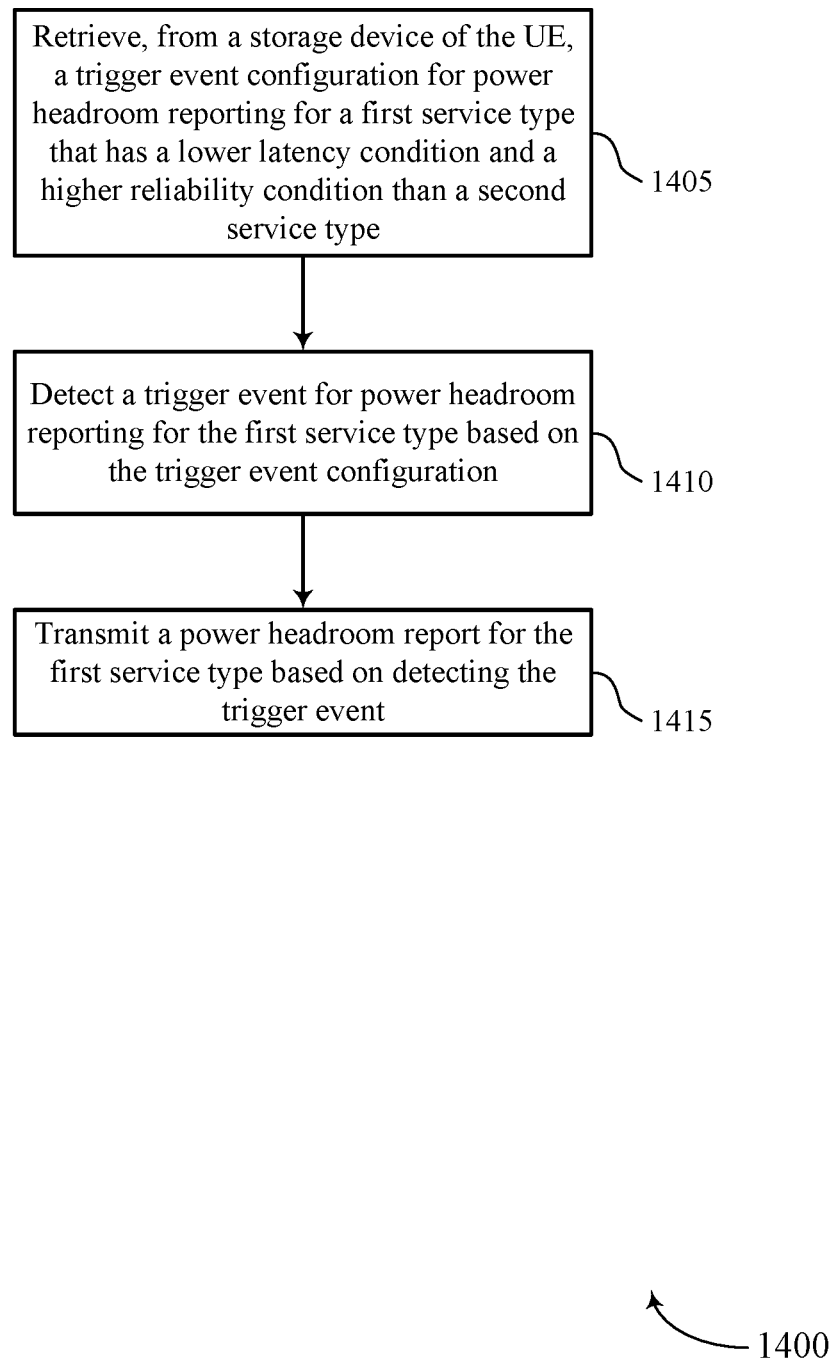

FIG. 14 shows a flowchart illustrating a method 1400 that supports power headroom report enhancement in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may retrieve, from a storage device of the UE, a trigger event configuration for power headroom reporting for a first service type that has a lower latency condition and a higher reliability condition than a second service type. The operations of 1405 may be performed according to the methods described herein. In some examples, aspects of the operations of 1405 may be performed by a trigger event configuration component as described with reference to FIGS. 4 through 7.

At 1410, the UE may detect a trigger event for power headroom reporting for the first service type based on the trigger event configuration. The operations of 1410 may be performed according to the methods described herein. In some examples, aspects of the operations of 1410 may be performed by a trigger event detecting component as described with reference to FIGS. 4 through 7.

At 1415, the UE may transmit a power headroom report for the first service type based on detecting the trigger event. The operations of 1415 may be performed according to the methods described herein. In some examples, aspects of the operations of 1415 may be performed by a power headroom report transmitting component as described with reference to FIGS. 4 through 7.

Figure 15:
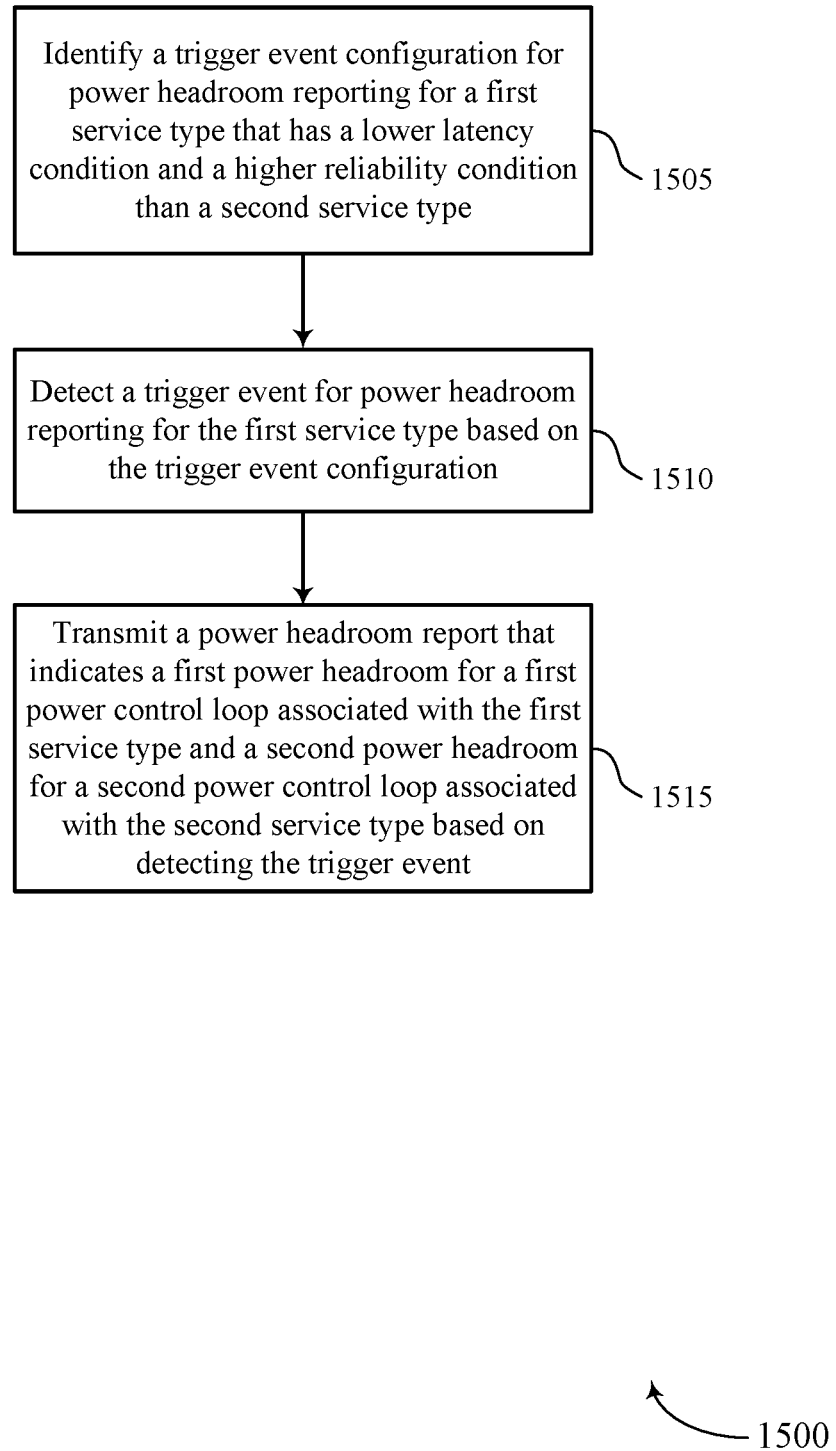

FIG. 15 shows a flowchart illustrating a method 1500 that supports power headroom report enhancement in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may identify a trigger event configuration for power headroom reporting for a first service type that has a lower latency condition and a higher reliability condition than a second service type. The operations of 1505 may be performed according to the methods described herein. In some examples, aspects of the operations of 1505 may be performed by a trigger event configuration component as described with reference to FIGS. 4 through 7.

At 1510, the UE may detect a trigger event for power headroom reporting for the first service type based on the trigger event configuration. The operations of 1510 may be performed according to the methods described herein. In some examples, aspects of the operations of 1510 may be performed by a trigger event detecting component as described with reference to FIGS. 4 through 7.

At 1515, the UE may transmit a power headroom report that indicates a first power headroom for a first power control loop associated with the first service type and a second power headroom for a second power control loop associated with the second service type based on detecting the trigger event. The operations of 1515 may be performed according to the methods described herein. In some examples, aspects of the operations of 1515 may be performed by a power headroom report transmitting component as described with reference to FIGS. 4 through 7. Some aspects of the operations of 1515 may be performed by a power control loop component as described with reference to FIGS. 4 through 7.

Figure 16:
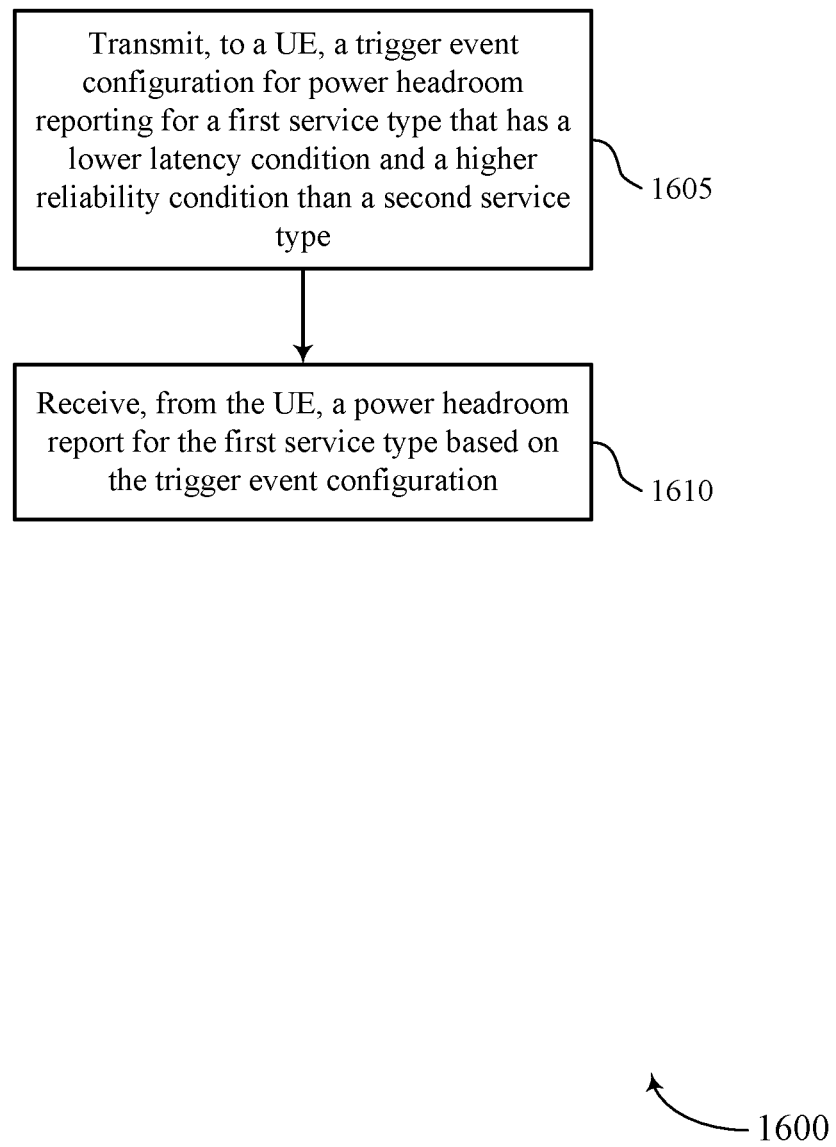

FIG. 16 shows a flowchart illustrating a method 1600 that supports power headroom report enhancement in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a trigger event configuration for power headroom reporting for a first service type that has a lower latency condition and a higher reliability condition than a second service type. The operations of 1605 may be performed according to the methods described herein. In some examples, aspects of the operations of 1605 may be performed by a trigger event configuration component as described with reference to FIGS. 8 through 11.

At 1610, the base station may receive, from the UE, a power headroom report for the first service type based on the trigger event configuration. The operations of 1610 may be performed according to the methods described herein. In some examples, aspects of the operations of 1610 may be performed by a power headroom report receiving component as described with reference to FIGS. 8 through 11.

Figure 17:
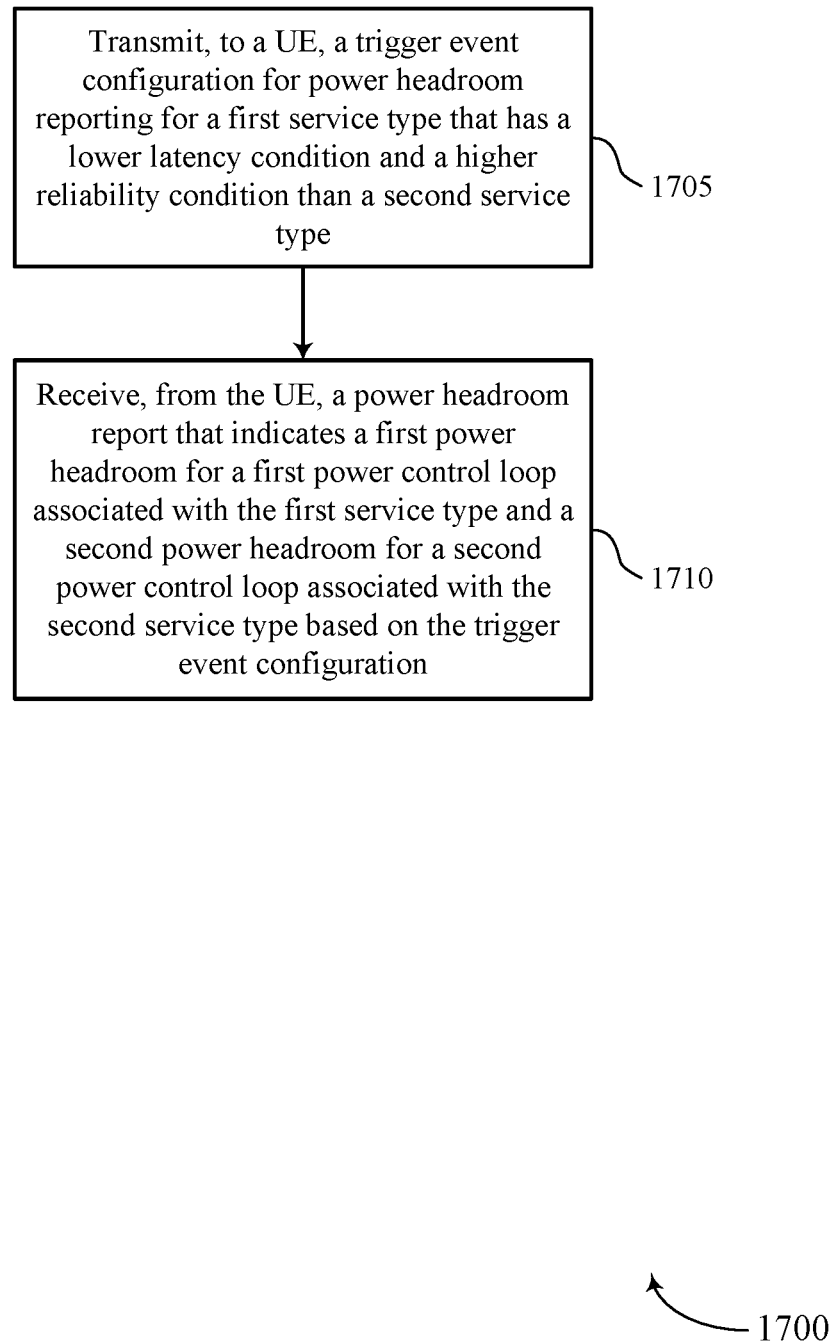

FIG. 17 shows a flowchart illustrating a method 1700 that supports power headroom report enhancement in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a trigger event configuration for power headroom reporting for a first service type that has a lower latency condition and a higher reliability condition than a second service type. The operations of 1705 may be performed according to the methods described herein. In some examples, aspects of the operations of 1705 may be performed by a trigger event configuration component as described with reference to FIGS. 8 through 11.

At 1710, the base station may receive, from the UE, a power headroom report that indicates a first power headroom for a first power control loop associated with the first service type and a second power headroom for a second power control loop associated with the second service type based on the trigger event configuration. The operations of 1710 may be performed according to the methods described herein. In some examples, aspects of the operations of 1710 may be performed by a power headroom report receiving component as described with reference to FIGS. 8 through 11. Some aspects of the operations of 1710 may be performed by a power control loop component as described with reference to FIGS. 8 through 11.

Figure 18:
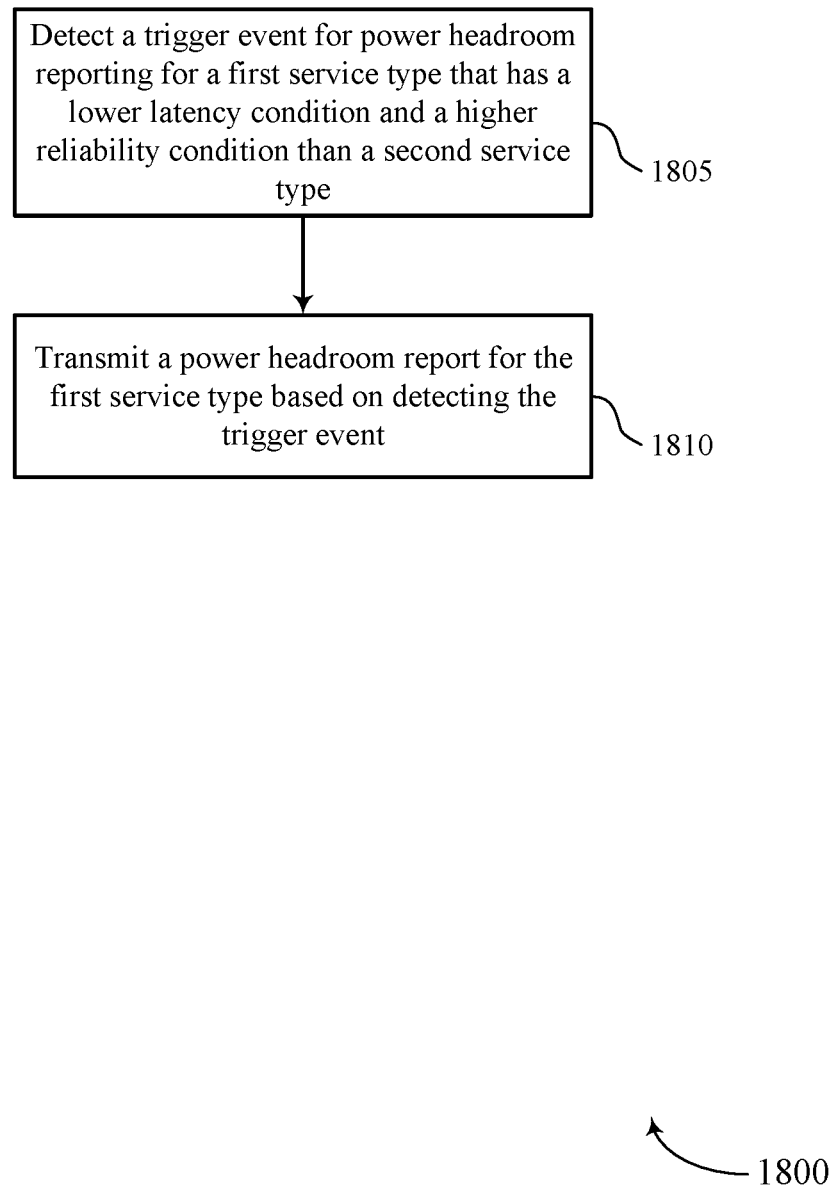

FIG. 18 shows a flowchart illustrating a method 1800 that supports power headroom report enhancement in accordance with aspects of the present disclosure. The operations of method 1800 may be implemented by a UE 115 or its components as described herein. For example, the operations of method 1800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1805, the UE may detect a trigger event for power headroom reporting for a first service type that has a lower latency condition and a higher reliability condition than a second service type based on the trigger event configuration. The operations of 1805 may be performed according to the methods described herein. In some examples, aspects of the operations of 1805 may be performed by a trigger event detecting component as described with reference to FIGS. 4 through 7.

At 1810, the UE may transmit a power headroom report for the first service type based on detecting the trigger event. The operations of 1810 may be performed according to the methods described herein. In some examples, aspects of the operations of 1810 may be performed by a power headroom report transmitting component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   detecting, based at least in part on a trigger event configuration for power headroom reporting for a first service type that has a lower latency condition and a higher reliability condition than a second service type, a trigger event for power headroom reporting for the first service type, the trigger event for power headroom reporting for the first service type being different from a second trigger event for power headroom reporting for the second service type;
   transmitting a power headroom report for the first service type based at least in part on detecting the trigger event;
   receiving first control signaling indicating a first set of resources for transmission of a first uplink message of the first service type based at least in part on the power headroom report, wherein the first set of resources overlap at least partially with a second set of resources for transmission of a second uplink message of the second service type;
   receiving, based at least in part on the power headroom report, second control signaling indicating to adjust a transmit power of the UE; and
   transmitting the first uplink message of the first service type using the adjusted transmit power via the first set of resources.

2. The method of claim 1, wherein transmitting the power headroom report comprises:
   transmitting the power headroom report on a first uplink shared channel for the first service type.

3. The method of claim 1, further comprising:
   detecting the second trigger event for power headroom reporting for the second service type; and
   refraining from transmitting a second power headroom report for the second service type on an uplink shared channel for the first service type.

4. The method of claim 1, wherein transmitting the power headroom report comprises:
   transmitting the power headroom report that indicates a power headroom value calculated for at least one carrier configured for the first service type.

5. The method of claim 4, wherein the power headroom report does not include a power headroom value calculated for any carrier configured for the second service type and not the first service type.

6. The method of claim 1, further comprising:
   identifying the trigger event configuration for power headroom reporting for the first service type.

7. The method of claim 6, wherein identifying the trigger event configuration comprises:
   receiving, from a network device, the trigger event configuration.

8. The method of claim 6, wherein identifying the trigger event configuration comprises:
   retrieving the trigger event configuration from a storage device of the UE.

9. The method of claim 6, wherein identifying the trigger event configuration comprises:
   identifying the trigger event configuration for the first service type that indicates to detect the trigger event based at least in part on receiving a power boosting functionality configuration or a power boosting functionality reconfiguration for the first service type.

10. The method of claim 9, wherein receiving the power boosting functionality configuration or the power boosting functionality reconfiguration comprises:
    receiving a configuration or a reconfiguration of a Radio Resource Control power control parameter or receiving a configuration of an open-loop power control parameter set indication in downlink control information.

11. The method of claim 6, wherein identifying the trigger event configuration comprises:
    identifying the trigger event configuration for the first service type that indicates to detect the trigger event based at least in part on detecting that the UE lacks sufficient headroom for power boosting for the first service type and based at least in part on detecting that a prohibit timer at the UE has expired.

12. The method of claim 6, wherein identifying the trigger event configuration comprises:
    identifying the trigger event configuration for the first service type that indicates to detect the trigger event based at least in part on detecting that the UE has transitioned from lacking sufficient headroom for power boosting for the first service type to having sufficient headroom for power boosting for the first service type and based at least in part on detecting that a prohibit timer at the UE has expired.

13. The method of claim 6, wherein identifying the trigger event configuration comprises:
    identifying the trigger event configuration for the first service type that indicates to detect the trigger event based at least in part on detecting a path loss change that satisfies a path loss threshold for the first service type.

14. The method of claim 6, wherein identifying the trigger event configuration comprises:
    identifying the trigger event configuration for the first service type that indicates to detect the trigger event based at least in part on detecting that a timer associated with the first service type has expired.

15. The method of claim 6, wherein identifying the trigger event configuration comprises:
    identifying the trigger event configuration for the first service type that indicates to detect the trigger event based at least in part on detecting the second trigger event for power headroom reporting for the second service type.

16. The method of claim 1, wherein transmitting the power headroom report comprises:
    transmitting the power headroom report that is associated with power boosting functionality for the first service type.

17. The method of claim 1, wherein transmitting the power headroom report comprises:
    transmitting the power headroom report comprising a power headroom value that is calculated based at least in part on a configured power boosting value.

18. The method of claim 1, wherein transmitting the power headroom report comprises:
    transmitting a medium access control (MAC) control element (CE) comprising the power headroom report on a first uplink shared channel for the first service type, a second uplink shared channel for the second service type, or both.

19. The method of claim 1, wherein transmitting the power headroom report comprises:
transmitting the power headroom report that indicates a power headroom value corresponding to a single carrier.

20. The method of claim 1, wherein transmitting the power headroom report comprises:
transmitting the power headroom report that indicates a plurality of power headroom values that respectively correspond to a plurality of carriers.

21. The method of claim 1, wherein a duration of a timer associated with the first service type is shorter than a duration of a timer associated with the second service type.

22. The method of claim 1, wherein transmitting the power headroom report comprises:
transmitting the power headroom report that indicates a first power headroom for a first power control loop associated with the first service type and a second power headroom for a second power control loop associated with the second service type.

23. A method for wireless communication by a network device, comprising:
transmitting, to a user equipment (UE), a trigger event configuration for power headroom reporting for a first service type that has a lower latency condition and a higher reliability condition than a second service type, the trigger event configuration indicating a trigger event for power headroom reporting for the first service type, wherein a second trigger event for power headroom reporting for the second service type is different from the trigger event for power headroom reporting for the first service type;
receiving, from the UE, a power headroom report for the first service type based at least in part on the trigger event configuration;
transmitting, first control signaling indicating a first set of resources for transmission of a first uplink message of the first service type based at least in part on the power headroom report, wherein the first set of resources overlap at least partially with a second set of resources for transmission of a second uplink message of the second service type;
transmitting, based at least in part on the power headroom report, second control signaling indicating to adjust a transmit power of the UE; and
receiving the first uplink message of the first service type according to the adjusted transmit power via the first set of resources.

24. The method of claim 23, wherein receiving the power headroom report comprises:
receiving the power headroom report that indicates a power headroom value calculated for at least one carrier configured for the first service type.

25. The method of claim 24, wherein the power headroom report does not include a power headroom value calculated for any carrier configured for the second service type and not the first service type.

26. An apparatus for wireless communication by a user equipment (UE), comprising:
a processor, memory coupled with the processor; and
instructions stored in the memory and executable by the processor to cause the apparatus to:
detect, based at least in part on a trigger event configuration for power headroom reporting for a first service type that has a lower latency condition and a higher reliability condition than a second service type, a trigger event for power headroom reporting for the first service type, the trigger event for power headroom reporting for the first service type being different from a second trigger event for power headroom reporting for the second service type;
transmit a power headroom report for the first service type based at least in part on detecting the trigger event;
receive first control signaling indicating a first set of resources for transmission of a first uplink message of the first service type based at least in part on the power headroom report, wherein the first set of resources overlap at least partially with a second set of resources for transmission of a second uplink message of the second service type;
receive, based at least in part on the power headroom report, second control signaling indicating to adjust a transmit power of the UE; and
transmit the first uplink message of the first service type using the adjusted transmit power via the first set of resources.

27. The apparatus of claim 26, wherein the instructions to transmit the power headroom report are executable by the processor to cause the apparatus to:
transmit the power headroom report that indicates a power headroom value calculated for at least one carrier configured for the first service type.

28. The apparatus of claim 27, wherein the power headroom report does not include a power headroom value calculated for any carrier configured for the second service type and not the first service type.

29. An apparatus for wireless communication by a network device, comprising:
a processor, memory coupled with the processor; and
instructions stored in the memory and executable by the processor to cause the apparatus to:
transmit, to a user equipment (UE), a trigger event configuration for power headroom reporting for a first service type that has a lower latency condition and a higher reliability condition than a second service type, the trigger event configuration indicating a trigger event for power headroom reporting for the first service type, wherein a second trigger event for power headroom reporting for the second service type is different from the trigger event for power headroom reporting for the first service type;
receive, from the UE, a power headroom report for the first service type based at least in part on the trigger event configuration;
transmit first control signaling indicating a first set of resources for transmission of a first uplink message of the first service type based at least in part on the power headroom report, wherein the first set of resources overlap at least partially with a second set of resources for transmission of a second uplink message of the second service type;
transmit, based at least in part on the power headroom report, second control signaling indicating to adjust a transmit power of the UE; and
receive the first uplink message of the first service type according to the adjusted transmit power via the first set of resources.

30. The apparatus of claim 29, wherein the instructions to receive the power headroom report are executable by the processor to cause the apparatus to:

receive the power headroom report that indicates a power headroom value calculated for at least one carrier configured for the first service type.

* * * * *